US 12,556,312 B2

United States Patent
Wang et al.

(10) Patent No.: US 12,556,312 B2
(45) Date of Patent: Feb. 17, 2026

(54) NEURAL NETWORK-BASED TRANSMISSION FEEDBACK IN A CELLULAR NETWORK

(71) Applicant: GOOGLE LLC, Mountain View, CA (US)

(72) Inventors: Jibing Wang, San Jose, CA (US); Erik Richard Stauffer, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 351 days.

(21) Appl. No.: 18/016,502

(22) PCT Filed: Jul. 26, 2021

(86) PCT No.: PCT/US2021/043195
§ 371 (c)(1),
(2) Date: Jan. 17, 2023

(87) PCT Pub. No.: WO2022/026397
PCT Pub. Date: Feb. 3, 2022

(65) Prior Publication Data
US 2023/0299885 A1    Sep. 21, 2023

Related U.S. Application Data

(60) Provisional application No. 63/059,367, filed on Jul. 31, 2020.

(51) Int. Cl.
*H04L 1/18* (2023.01)
*G06N 3/045* (2023.01)
(Continued)

(52) U.S. Cl.
CPC .......... *H04L 1/1812* (2013.01); *G06N 3/045* (2023.01); *G06N 3/048* (2023.01); *H04L 1/1874* (2013.01); *H04L 1/1887* (2013.01)

(58) Field of Classification Search
None
See application file for complete search history.

(56) References Cited

U.S. PATENT DOCUMENTS 10,256,872 B2    4/2019  Jiang et al.
10,523,281 B2   12/2019  John Wilson et al.
(Continued)

FOREIGN PATENT DOCUMENTS

CN    111182644 A    5/2020
EP      2688311 A2    1/2014
(Continued)

OTHER PUBLICATIONS

International Preliminary Report on Patentability mailed Feb. 9, 2023 for PCT Application No. PCT/US2021/043195, 9 pages.
(Continued)

*Primary Examiner* — Hashim S Bhatti
*Assistant Examiner* — Ahmed Saifuddin

(57) ABSTRACT

Two devices in wireless communication implement a soft transmission feedback scheme. A data-sending device wirelessly communicates a first transmission representing a data block and generated using one or more neural networks to a data-receiving device, which processes the first transmission using one or more neural networks to attempt to recover the data block, as well as to generate transmission feedback indicating a status of the recovery attempt. The feedback is used by one or more neural networks to generate a second transmission that is wirelessly communicated to the data-sending device. One or more neural networks process the second transmission to generate a retransmit control signal. One or more neural networks selectively include at least a portion of the data block for retransmission in a third transmission to the data-receiving device based on the retransmit control signal.

26 Claims, 8 Drawing Sheets

(51) Int. Cl.
*G06N 3/048* (2023.01)
*H04L 1/1812* (2023.01)
*H04L 1/1867* (2023.01)

(56) References Cited

U.S. PATENT DOCUMENTS

| | | |
|---|---|---|
| 10,785,681 B1 | 9/2020 | Ge et al. |
| 2009/0307559 A1 | 12/2009 | Wu et al. |
| 2017/0359106 A1* | 12/2017 | John Wilson .......... H04B 7/0617 |
| 2018/0023956 A1 | 1/2018 | Chen |
| 2018/0191422 A1 | 7/2018 | Xia et al. |
| 2018/0270022 A1* | 9/2018 | Sun .......... H04L 1/1614 |
| 2018/0322388 A1 | 11/2018 | O'Shea |
| 2019/0065951 A1* | 2/2019 | Luo .......... G08G 1/166 |
| 2019/0171937 A1 | 6/2019 | Lin et al. |
| 2019/0274108 A1 | 9/2019 | O'Shea et al. |
| 2020/0077285 A1 | 3/2020 | Yu et al. |
| 2020/0275402 A1 | 8/2020 | Shi et al. |
| 2020/0366385 A1 | 11/2020 | Ge et al. |
| 2020/0404644 A1 | 12/2020 | Zhu et al. |
| 2021/0075691 A1 | 3/2021 | Zeng et al. |
| 2022/0086057 A1* | 3/2022 | Pezeshki .......... H04W 64/003 |
| 2022/0353012 A1* | 11/2022 | Honkala .......... G06N 3/045 |

FOREIGN PATENT DOCUMENTS

| | | |
|---|---|---|
| EP | 3418948 A1 | 12/2018 |
| JP | S50126309 A | 10/1975 |
| JP | 2006245912 A | 9/2016 |
| WO | 2012097003 A3 | 7/2012 |
| WO | 2014037687 A1 | 3/2014 |
| WO | 2019218280 A1 | 11/2019 |
| WO | 2020040723 A1 | 2/2020 |
| WO | 2020043284 A1 | 3/2020 |
| WO | 2020068127 A1 | 4/2020 |
| WO | 2020143902 A1 | 7/2020 |
| WO | 2018143785 A1 | 8/2020 |
| WO | 2020171803 A1 | 8/2020 |
| WO | 2021029889 A1 | 2/2021 |

OTHER PUBLICATIONS

Editors, "Draft new Supplement 55 to ITU-T Y.3170-series (former ITU-T Y.ML-IMT2020-Use-Cases): 'Machine learning in future networks including IMT-2020: use cases'—for approval", International Telecommunication Union: Telecommunication Standardization Sector: SG 13-TD224/PLEN Study Group 13, Oct. 14-25, 2019, 60 pages.

Jia, Chenglu et al., "Machine Learning Empowered Beam Management for Intelligent Reflecting Surface Assisted Mmwave Networks", arXiv:2003.01306v1 [eess.SP], Mar. 3, 2020, 8 pages.

Translation of Japanese Office Action mailed Jul. 2, 2024 for JP Application No. 2023506337, 5 pages.

International Search Report and Written Opinion mailed Nov. 16, 2021 for corresponding International Application No. PCT/US2021/043195, 14 pages.

Strodthoff, N. et al., "Enhanced Machine Learning Techniques for Early HARQ Feedback Prediction in 5G", IEEE Journal on Selected Areas in Communications; vol. 37, Issue 11; Nov. 1, 2019, pp. 2573-2587.

International Search Report and Written Opinion mailed Sep. 21, 2022 for International Application No. PCT/US2022/018258, 25 pages.

Vakil, A. et al., "Feature Level Sensor Fusion for Passive RF and EO Information Integration", IEEE 2020 Aerospace Conference; Mar. 7-14, 2020; 9 pages.

Machine Translation of Japanense Decision of Refusal mailed Feb. 20, 2025 for JP Application No. 2023-506337, 3 pages.

Communication pursuant to Article 94(3) EPC mailed Jul. 29, 2025 for EP Application No. 21758219.6, 6 pages.

Machine Translation of Japanese Reconsideration Report by Examiner before Appeal mailed Sep. 26, 2025 for JP Application No. 2023-506337, 2 pages.

European Office Action dated Dec. 12, 2025 for EP Application No. 21758219.6, 6 pages.

* cited by examiner

DOWNLINK 101

UPLINK 103

NEURAL NETWORK-BASED TRANSMISSION FEEDBACK IN A CELLULAR NETWORK

CROSS-REFERENCE TO RELATED APPLICATIONS

The present application is a U.S. National Stage under 35 U.S.C. § 371 of International Patent Application Serial No. PCT/US2021/043195, entitled "NEURAL NETWORK-BASED TRANSMISSION FEEDBACK IN A CELLULAR NETWORK" and filed on Jul. 26, 2021, which claims priority to U.S. Provisional Application No. 63/059,367, entitled "NEURAL NETWORK-BASED TRANSMISSION FEEDBACK IN A CELLULAR NETWORK" and filed on Jul. 31, 2020, the entireties of which are incorporated by reference herein.

BACKGROUND

Wireless communication networks increasingly are tasked to provide high data throughput between wireless devices, such as between a base station and corresponding user equipment (UE). Techniques to provide sufficient data throughput, including the use of relatively-high carrier frequency bands (e.g., up to 100 gigahertz or more) for the radio frequency (RF) signals, often cause the RF signals to be susceptible to transmission errors resulting from, for example, multipath fading, atmospheric absorption, bodily absorption, diffraction, or interference. A frequent solution to address such transmission errors is the use of a transmission feedback scheme in which a data-receiving device signals successful reception or unsuccessful reception of a transmitted data block via return transmission of an acknowledged (or "ACK") signal or not-acknowledged (or "NACK") signal, respectively (such signals often collectively referred to as an "ACK/NACK signal"). For example, some cellular systems utilize an automatic repeat request (ARQ) scheme in which a data block to be transmitted is encoded with a cyclic redundancy check (CRC) value, a parity value, or other error-detecting code at the data-sending device such that the data-receiving device can utilize the error-detecting code to determine if the data block has been received and recovered correctly. The data-receiving device can then send an ACK/NACK signal to the data-sending device that signals whether the data-receiving device recovered the data block correctly. If the ACK/NACK signal indicates that the signal representing the data block was corrupted during transmission, the data-sending device retransmits the data block.

Because retransmission of each corrupted data block negatively impacts spectral efficiency, more complex transmission feedback schemes have been developed to provide improved transmission efficiency while retaining data transmission reliability. One such scheme is Hybrid ARQ (or HARQ), in which a data block to be transmitted is encoded with a forward error correction (FEC) code, which allows the data-receiving device to detect, and in some instances correct, certain errors identified in the received data. If the FEC code is insufficient to allow the data-receiving device to correct all identified errors, the data-receiving device can request retransmission similar to the simpler ARQ scheme. The HARQ scheme can be further enhanced by using a soft combining approach in which each successive transmission of the data block is transmitted using a different encoding and each constituent encoding is then used at the data-receiving device to obtain a single, combined recovered data block.

While such transmission feedback schemes can be effective at providing sufficient data transmission reliability, their implementation can be relatively complex. For example, implementation of HARQ with soft combining in the Fifth Generation (5G) New Radio (NR) specifications promulgated by the Third Generation Partnership Project (3GPP) entails an asynchronous HARQ protocol employed using a set of parallel processes for a corresponding set of code blocks or code block groups of each transport block, and in some implementations further utilizes a multidimensional HARQ acknowledgment codebook to facilitate multiplexing of HARQ acknowledgments. This complexity in the transmission feedback scheme itself typically translates to commensurate complexity in designing, testing, and implementing a hard-coded implementation of the transmission feedback scheme at a device. Moreover, such hard-coded implementations often are resistant to changes or updates to the underlying transmission feedback scheme, which then either requires additional effort to ensure legacy compatibility for the updated scheme or results in the implementing device being rendered obsolete.

SUMMARY OF EMBODIMENTS

Two devices in wireless communication, such as a base station and a UE, implement one or more DNNs or other neural networks jointly trained to provide a soft transmission feedback scheme. A data-sending device wirelessly communicates a first transmission representing a data block and generated using one or more neural networks to a data-receiving device, which processes the first transmission using one or more neural networks to attempt to recover the data block, as well as to generate a feedback transmission signal indicating a status of the recovery attempt. The feedback signal is used by one or more neural networks to generate a second transmission that is wirelessly communicated to the data-sending device. One or more neural networks process the second transmission to generate a retransmit control signal. One or more neural networks selectively include at least a portion of the data block for retransmission in a third transmission to the data-receiving device based on the retransmit control signal.

In one aspect, a computer-implemented method, in a data-sending device, includes buffering a first data block in a delay buffer, processing the first data block at a transmitter neural network of the data-sending device to generate a first transmission for wireless communication to a data-receiving device, and wirelessly communicating the first transmission to the data-receiving device. The method further includes processing a second transmission wirelessly received from the data-receiving device at a receiver neural network of the data-sending device to generate a retransmit control signal. The method also includes generating a third transmission for wireless communication to the data-receiving device by applying a gating function to the first data block in the delay buffer using the retransmit control signal as a control input and providing an output of the gating function to an input of the transmitter neural network, and wirelessly communicating the third transmission to the data-receiving device.

In some embodiments, the retransmit control signal includes a binary signal and generating the third transmission includes generating the third transmission based on at least a portion of the first data block responsive to the binary signal having a first value and generating the third transmission independent of the first data block responsive to the binary signal having a second value. In other embodiments, the retransmit control signal includes a non-linear activation function and generating the third transmission includes generating the third transmission to include one or more portions of the first data block based on the non-linear activation function.

The above method further can include jointly training the transmitter neural network and the receiver neural network in conjunction with at least one neural network of the data-receiving device using one or more sets of training data. In some embodiments, each of the transmitter neural network and the receiver neural network has a plurality of neural network architecture configurations, each neural network architecture configuration associated with a different corresponding scheduling grant type of a plurality of scheduling grant types, and jointly training the transmitter neural network and the receiver neural network includes individually training multiple neural network architecture configurations of the plurality of neural network architecture configurations. In this case, the method further can include determining a current scheduling grant type implemented for the data-sending device and configuring the transmitter neural network and the receiver neural network to implement a neural network architecture configuration of the plurality of neural network architecture configurations that is associated with the current scheduling grant type. The plurality of scheduling grant types can include a grant to transmit control information only; a grant to transmit user-plane data only; and a grant to transmit both control information and user-plane data.

In some embodiments, generating the third transmission includes generating the third transmission at the transmitter neural network further based on a second data block received subsequent to the first data block. Further, in some embodiments, processing the second transmission at the receiver neural network of the data-sending device further includes processing the second transmission at the receiver neural network of the data-sending device to attempt to recover a second data block from the second transmission. In this case, the method further may include generating a transmission feedback signal at the receiver neural network of the data-sending device, the transmission feedback signal representing a status of recovery of the second data block from the second transmission, and wherein generating the third transmission further includes processing the transmission feedback signal at the transmitter neural network of the data-sending device.

In some embodiments, the receiver neural network and the transmitter neural network of the data-sending device include deep neural networks.

In accordance with another aspect, a data-sending device includes a radio frequency front end, at least one processor coupled to the radio frequency front end, and a non-transitory computer-readable medium storing one or more sets of instructions, the one or more sets of instructions configured to manipulate the at least one processor to perform the method above.

In accordance with yet another aspect, a computer-implemented method, in a data-receiving device, includes receiving, at a receiver neural network of the data-receiving device, a first transmission wirelessly communicated from a data-sending device and processing the first transmission at the receiver neural network of the data-receiving device to attempt to recover a first data block and to generate a first transmission feedback signal representative of the attempt to recover the first data block. The method further includes generating, at a transmitter neural network of the data-receiving device, a second transmission based on the first transmission feedback signal and wirelessly communicating the second transmission to the data-sending device. In some embodiments, the first transmission feedback signal represents a failed attempt to recover the first data block, and the method further includes receiving, at the receiver neural network, a third transmission wirelessly communicated from the data-sending device, processing the third transmission at the receiver neural network of the data-receiving device to attempt to recover at least a portion of the first data block and to generate a second transmission feedback signal representative of the attempt to recover at least a portion of the first data block, and generating, at the transmitter neural network, a fourth transmission for wireless communication to the data-sending device based on the second transmission feedback signal.

The method further can include jointly training the transmitter neural network and the receiver neural network in conjunction with at least one neural network of the data-sending device using one or more sets of training data. In some embodiments, each of the transmitter neural network and the receiver neural network has a plurality of neural network architecture configurations, each neural network architecture configuration associated with a different corresponding scheduling grant type of a plurality of scheduling grant types, and jointly training the transmitter neural network and the receiver neural network includes individually training multiple neural network architecture configurations of the plurality of neural network architecture configurations. Further, the method can include determining a current scheduling grant type implemented for the data-receiving device, and configuring the transmitter neural network and the receiver neural network to implement a neural network architecture configuration of the plurality of neural network architecture configurations that is associated with the current scheduling grant type. The plurality of scheduling grant types may include: a grant to transmit control information only; a grant to transmit user-plane data only; and a grant to transmit both control information and user-plane data. In some embodiments, the current scheduling grant type includes a grant to transmit user-plane data only, and configuring the receiver neural network to implement a neural network architecture configuration includes configuring the receiver neural network to implement a neural network architecture configuration trained for processing transmissions representing user-plane data only. In other embodiments, the current scheduling grant type includes a grant to transmit both control information and user-plane data, and configuring the receiver neural network to implement a neural network architecture configuration includes configuring the receiver neural network to implement a neural network architecture configuration trained for processing transmissions representing both control information and user-plane data.

The first transmission feedback signal can include one of a binary signal or a differentiable signal. The receiver neural network and the transmitter neural network can include deep neural networks.

The current scheduling grant type can include a grant to transmit user-plane data only; and configuring the receiver neural network to implement a neural network architecture configuration can include configuring the receiver neural network to implement a neural network architecture configuration trained for processing transmissions representing user-plane data only. Alternatively, the current scheduling grant type can include a grant to transmit both control information and user-plane data; and configuring the receiver neural network to implement a neural network architecture configuration can include configuring the receiver neural network to implement a neural network architecture configuration trained for processing transmissions representing both control information and user-plane data.

In accordance with another aspect, a data-receiving device includes a radio frequency front end, at least one processor coupled to the radio frequency front end, and at least one storage component storing a set of instructions, the set of instructions configured to manipulate the at least one processor to perform the methods above.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
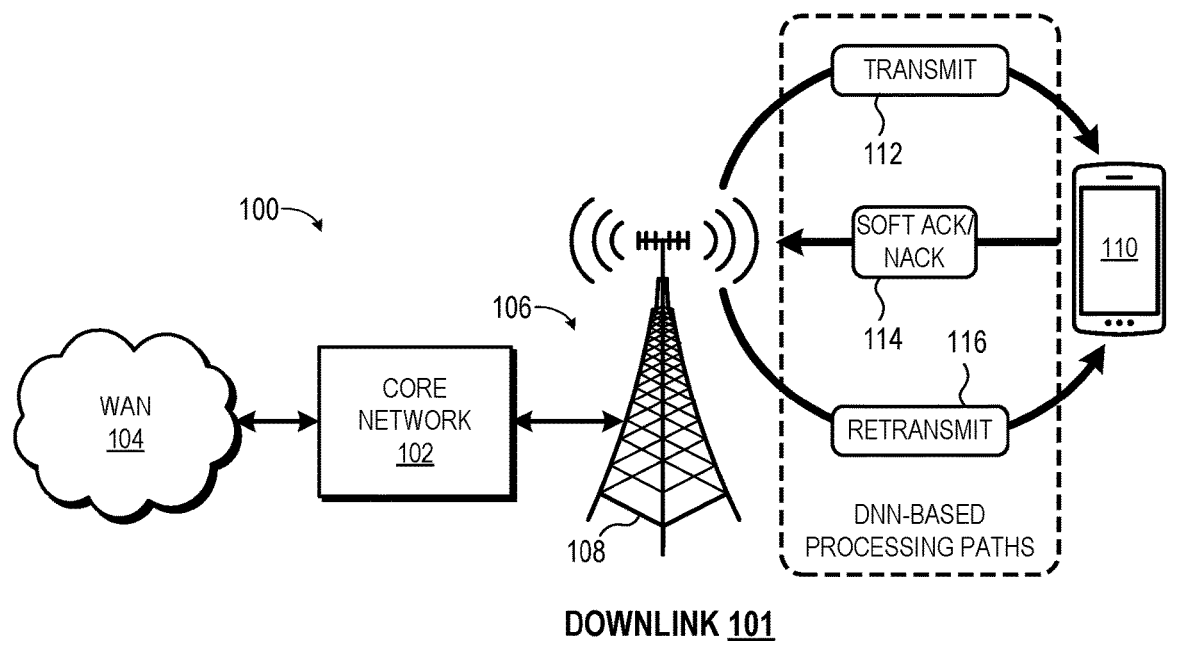
FIG. 1 is a diagram illustrating an example wireless system employing a neural-network-based retransmit scheme in accordance with some embodiments.
Figure 1:
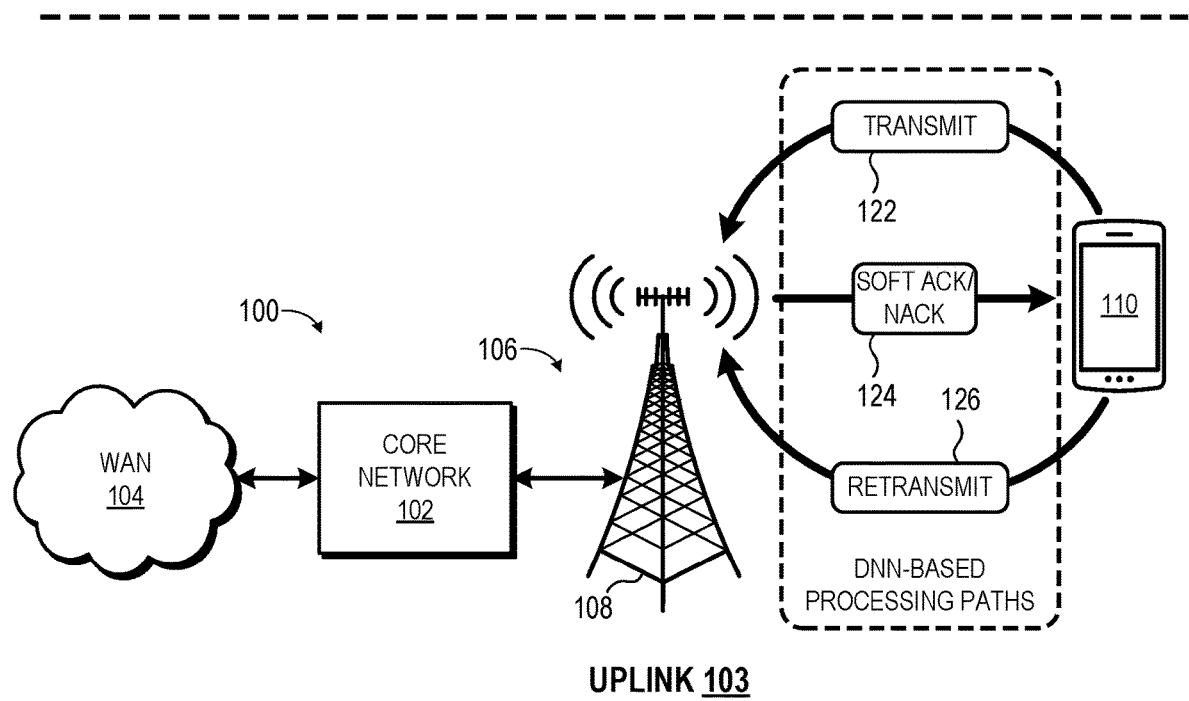

Conventional wireless communication networks employ transmitter and receiver processing paths with complex functionality. Typically, each process block in a processing path is designed, tested, and implemented relatively separate from the other blocks. Later, a processing path of blocks is integrated and further tested and adjusted. As described herein, much of the design, test, and implementation efforts for a transmitting processing path or receiving processing path can be bypassed through the use of a neural network (also commonly referred to as an artificial neural network) in place of some or all of the individual blocks of a processing path. In this approach, the neural networks on the transmitting processing paths and receiving processing paths of a base station and one or more wirelessly-connected UEs can be jointly trained to provide similar functionality as one or more conventional individual processing blocks in the corresponding path. Moreover, these neural networks can be dynamically reconfigured during operation by, for example, modifying coefficients, layer sizes and connections, kernel sizes, and other parameter configurations to adapt to changing operating conditions.

As particularly described below with reference to FIGS. 1-9, one functionality conventionally implemented by separate hard-coded design that can be replaced in whole or in part by a neural-network-based configuration is the transmission feedback scheme employed between a data-sending device and a data-receiving device. In some embodiments, a base station and a UE each employs a transmitter (TX) processing module and a receiver (RX) processing module, with the TX processing module of the base station in operative communication with the RX processing module of the UE, and the TX processing module of the UE in operative communication with the RX processing module of the base station. Each processing module implements at least one neural network, such as a deep neural network (DNN)(that is, a neural network with at least one hidden layer), and the neural networks of the TX and RX processing modules of the base station and UE are trained jointly or individually using one or more sets of training data to provide data retransmission functionality in addition to various other transmission/reception functionality, such as coding and decoding, modulation and demodulation, and the like.

As a general overview of the data retransmission functionality, in at least one embodiment the TX processing module of the data-sending device (e.g., a base station for purposes of this overview) receives as input a first data block and from at least this input generates a first transmission for communication to the data-receiving device (e.g., a UE for purposes of this overview). The RX processing module of the data-receiving device processes this transmission to generate a transmission feedback signal representing a differentiable or other soft signal indicative of a status of recovery of the first data block, such as a potential for, or probability of, successful recovery the first data block. The transmission feedback signal is provided as an input to the TX processing module of the data-receiving device, which processes the transmission feedback signal to generate a second transmission for communication to the data-sending device.

The RX processing module of the data-sending device processes the second transmission to generate a retransmit control signal, which may be implemented as either a binary value (e.g., "0" for NACK, "1" for ACK) or as a non-linear activation function (e.g., a sigmoid or hyperbolic tangent (tan h) activation function) or other soft signal. The TX processing module of the data-sending device then receives as inputs this retransmit control signal, the first data block (the previously-transmitted data block), and a second data block (a not-yet-transmitted data block), and processes these inputs to generate a third transmission for communication to the data-receiving device. In processing these inputs, the retransmit control signal is used by the TX processing module to determine whether to retransmit the first data block, and in the event that the retransmit input signal is an activation function, to further identify the portion(s) of the first data block to be retransmitted, and include the first data block, or identified portions thereof, in the third transmission. In the event that the retransmit input signal reflects that the first data block was fully recovered at the data-receiving device, the second data block is incorporated by the TX processing module into the third transmission.

The RX processing module of the data-receiving device receives and processes the third transmission. In the event that the third transmission includes the retransmission of some or all of the first data block, this processing can include attempted extraction of a portion or all of the first data block. In the event that the third transmission includes a new transmission of the second data block, this processing can include attempted extraction of the second data block. In either event, the RX processing module of the data-receiving device generates a transmission feedback signal, which is provided as input to the TX processing module of the data-receiving device for incorporation into another transmission for processing at the data-sending device in the same manner described above.

FIG. 1 illustrates downlink (DL) and uplink (UL) operations of an example wireless communications network 100 employing a neural network-based transmission feedback scheme in accordance with some embodiments. As depicted, the wireless communication network 100 includes a core network 102 coupled to one or more wide area networks (WANs) 104 or other packet data networks (PDNs), such as the Internet. The core network 102 is further connected to one or more edge networks 106 via one or more backhaul networks (not shown). Each edge network 106 (also commonly referred to as a "cell" or a "radio access network" (RAN)) represents a corresponding fixed or mobile coverage area and includes at least one base station 108 to wirelessly communicate with one or more UEs, such as UE 110, via radio frequency (RF) signaling using one or more applicable radio access technologies (RATs) as specified by one or more communications protocols or standards. As such, the base station 108 operates as the wireless interface between the UE 110 and various networks and services provided by the core network 102 and other networks, such as packet-switched (PS) data services, circuit-switched (CS) services, and the like. Conventionally, communication of signaling from the base station 108 to the UE 110 is referred to as "downlink" or "DL" whereas communication of signaling from the UE 110 to the base station 108 is referred to as "uplink" or "UL."

The base station 108 can employ any of a variety of RATs, such as operating as a NodeB (or base transceiver station (BTS)) for a Universal Mobile Telecommunications System (UMTS) RAT (also known as "3G"), operating as an enhanced NodeB (eNodeB) for a Third Generation Partnership Project (3GPP) Long Term Evolution (LTE) RAT, operating as a 5G node B ("gNB") for a 3GPP Fifth Generation (5G) New Radio (NR) RAT, and the like. The UE 110, in turn, can implement any of a variety of electronic devices operable to communicate with the base station 108 via a suitable RAT, including, for example, a mobile cellular phone, a cellular-enabled tablet computer or laptop computer, a desktop computer, a cellular-enabled video game system, a server, a cellular-enabled appliance, a cellular-enabled automotive communications system, and the like.

Communication of information over an air interface formed between the base station 108 and the UE 110 takes the form of RF signals that represents both control plane signaling and user data plane signaling. However, due to the relatively high frequencies and relatively-tight timing margins typically employed, the RF signaling is susceptible to attenuation and interference and thus often may result in a failed attempt to extract at least part of the information from the received signal. As noted above, conventional wireless networks seek to mitigate the risk of signal corruption through the use of a hard-coded transmission feedback process in which the data-receiving device sends an ACK/NACK signal back to the data-transmitting device to inform the data-transmitting device whether the transmitted information was extracted correctly or if some part of the transmitted information was corrupted and thus needs to be retransmitted. However, as also noted above, the conventional approach to transmission feedback is hard-coded and fixed, requires extensive efforts to design, test, and implement, and is often difficult to modify or otherwise upgrade with components already deployed in the field.

Accordingly, in some embodiments both the base station 108 and the UE 110 implement transmitter (TX) and receiver (RX) processing paths that integrate one or more neural networks (NNs) that may be jointly trained and which are trained or otherwise configured to provide data retransmission from the data-sending device based on soft transmission feedback from the data-receiving device. To illustrate, view 101 of FIG. 1 depicts an overview of the downlink transmission process using soft transmission feedback. The base station 108, as the data-sending device, uses its NN-based TX processing path to generate a transmission 112 that incorporates DL data intended for the UE 110 as the data-receiving device and then wirelessly communicates the transmission 112 to the UE 110. The NN-based RX processing path of the UE 110 processes the transmission 112 and generates a soft transmission feedback signal that is provided as an input to the NN-based feedback path of the UE 110, which in turn generates a control signal 114 (referred to as "soft ACK/NACK" in the figure) that is communicated back to the base station 108. The NN-based RX processing path of the base station 108 processes the feedback of the control signal 114 and generates a retransmit control signal, which in turn is used by the TX processing path of the base station 108 to determine whether to selectively incorporate some or all of the DL data into an upcoming transmission 116, that is, whether to implement the upcoming transmission 116 at least partly as a retransmission of some or all of the DL data previously transmitted.

As shown in view 103 of FIG. 1, uplink transmissions are handled in a similar way, but with the UE 110 as the data-sending device and the base station 108 as the data-receiving device. In this situation, the UE 110, as the data-sending device, uses its NN-based TX processing path to generate a transmission 122 that incorporates UL data intended for the base station 108 as the data-receiving device and then wirelessly communicates the transmission 122 to the base station 108. The NN-based feedback path of the base station 108 processes the transmission 122 and generates a soft transmission feedback signal that is provided as an input to the NN-based feedback path of the base station 108, which in turn generates a control signal 124 (also referred to as "soft ACK/NACK" in the figure) that is communicated back to the UE 110. The NN-based RX processing path of the UE 110 processes the control signal 124 and generates a retransmit control signal, which in turn is used by the TX processing path of the UE 110 to determine whether to selectively incorporate some or all of the UL data into an upcoming transmission 126; that is, whether to implement the upcoming transmission 126 at least partly as a retransmission of some or all of the DL data previously transmitted.

Figure 2:
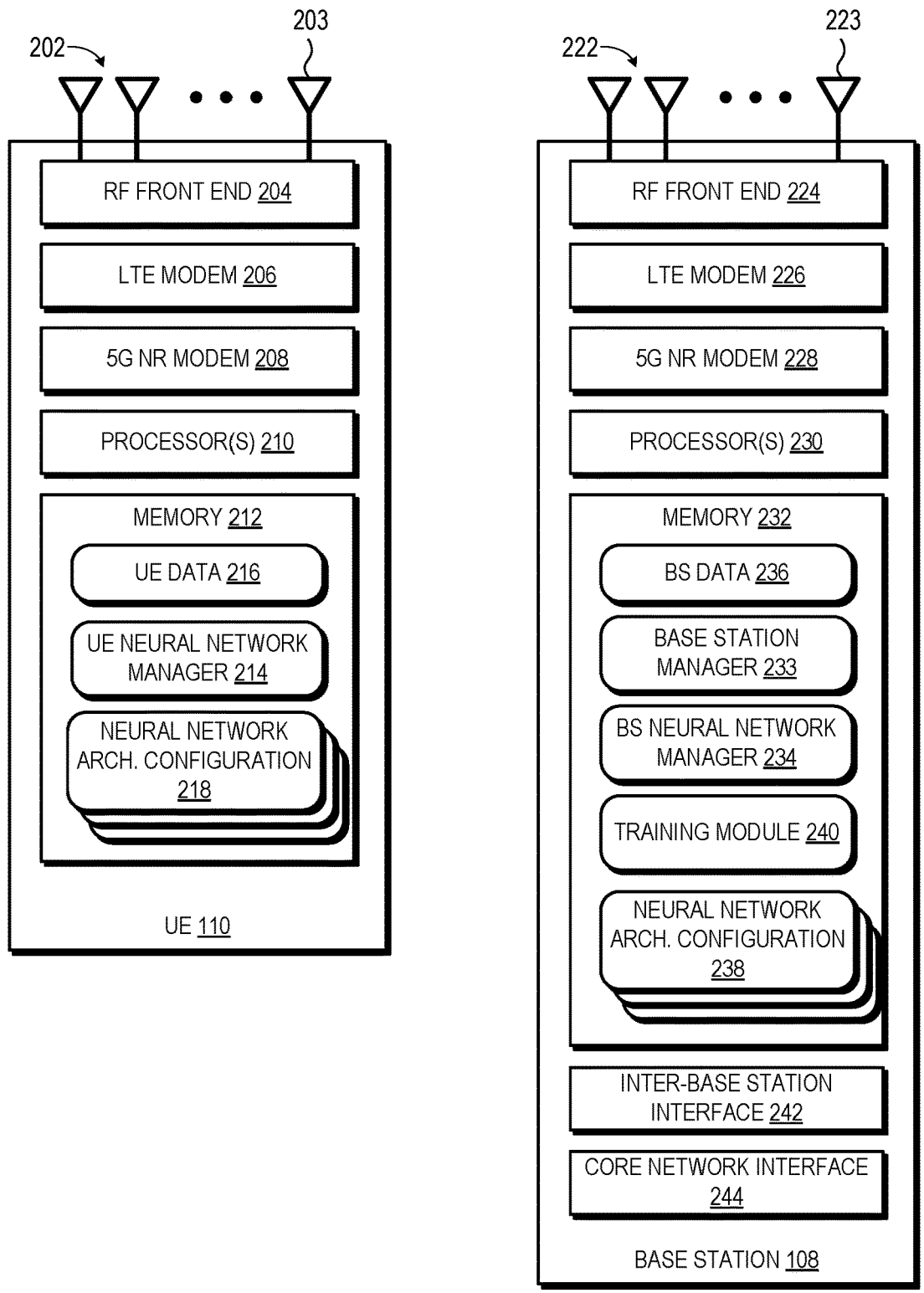
FIG. 2 is a diagram illustrating example configurations of a base station and a UE implementing neural-network-based transmitter and receiver processing paths in accordance with some embodiments.

FIG. 2 illustrates example hardware configurations for the UE 110 and base station 108 in accordance with some embodiments. Note that the depicted hardware configurations represent the processing components and communication components most directly related to the neural network-based transmission feedback processes described herein and omit certain components well-understood to be frequently implemented in such electronic devices, such as displays, user input/output (I/O) devices, power supplies, and the like.

In the depicted configuration, the UE 110 includes an array 202 of one or more antennas 203, an RF front end 204, and one or more wireless modems implementing corresponding cellular protocols for conducting RF-based communications with the base station 108 and other base stations, such as an LTE modem 206 and a 5G NR modem 208. The RF front end 204 operates to conduct signals between the modems 206, 208 and the array 202 to facilitate various types of wireless communication. The antennas 203 can include an array of multiple antennas that are configured similar to or different from each other and can be tuned to one or more frequency bands associated with the corresponding RAT.

The UE 110 further includes one or more processors 210 and one or more non-transitory computer-readable media 212. The one or more processors 210 can include, for example, one or more central processing units (CPUs), graphics processing units (GPUs), an artificial intelligence (AI) accelerator or other application-specific integrated circuits (ASIC), and the like. To illustrate, the processors 210 can include an application processor (AP) utilized by the UE 110 to execute an operating system and various user-level software applications, as well as one or more processors utilized by the modems 206, 208. The computer-readable media 212 can include any of a variety of media used by electronic devices to store data and/or executable instructions, such as random access memory (RAM), read-only memory (ROM), caches, Flash memory, solid-state drive (SSD) or other mass-storage devices, and the like. For ease of illustration and brevity, the computer-readable media 212 is referred to herein as "memory 212" in view of frequent use of system memory or other memory to store data and instructions for execution by the processor 210, but it will be understood that reference to "memory 212" shall apply equally to other types of storage media unless otherwise noted.

The one or more memories 212 of the UE 110 are used to store one or more sets of executable software instructions and associated data that manipulate the one or more processors 210 and other components of the UE 110 to perform the various functions described herein and attributed to the UE 110. The sets of executable software instructions include, for example, an operating system (OS) and various drivers (not shown), various software applications (not shown), and a UE neural network manager 214 that implements one or more neural networks for the UE 110, such as the neural networks employed in the transmitter and receiver processing paths as described in detail below. The data stored in the one or more memories 212 includes, for example, UE device data 216 and one or more neural network architecture configurations 218. The UE device data 216 represents, for example, user data, multimedia data, beamforming codebooks, software application configuration information, and the like. The one or more neural network architecture configurations 218 include one or more data structures containing data and other information representative of a corresponding architecture and/or parameter configurations used by the UE neural network manager 214 to form a corresponding neural network of the UE 110. The information included in a neural network architectural configuration 218 includes, for example, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network architecture configuration 218 includes any combination of NN formation configuration elements (e.g., architecture and/or parameter configurations) that can be used to create a NN formation configuration (e.g., a combination of one or more NN formation configuration elements) that defines and/or forms a DNN.

Turning to the hardware configuration of the base station 108, it is noted that although the illustrated diagram represents an implementation of the base station 108 as a single network node (e.g., a gNB), the functionality, and thus the hardware components, of the base station 108 instead may be distributed across multiple network nodes or devices and may be distributed in a manner to perform the functions described herein. As with the UE 110, the base station 108 includes an array 222 of one or more antennas 223, an RF front end 224, and one or more wireless modems, such as an LTE modem 226 and a 5G NR modem 228, for communicating with the UE 110, as well as one or more processors 230 and one or more non-transitory computer-readable storage media 232 (as with the memory 212 of the UE 110, the computer-readable medium 232 is referred to herein as a "memory 232" for brevity). These components operate in a similar manner as described above with reference to corresponding components of the UE 110.

The one or more memories 232 of the base station 108 store one or more sets of executable software instructions and associated data that manipulate the one or more processors 230 and other components of the base station 108 to perform the various functions described herein and attributed to the base station 108. The sets of executable software instructions include, for example, an operating system (OS) and various drivers (not shown), various software applications (not shown), a base station manager 233, and a base station neural network manager 234. The base station manager 233 configures modems 226, 228 for communication with the UE 110, as well as communication with a core network, such as the core network 102. The base station neural network manager 234 implements one or more neural networks for the base station 108, such as the neural networks employed in the transmitter and receiver processing paths as described in detail below.

The data stored in the one or more memories 232 of the base station 108 includes, for example, base station data 236 and one or more neural network architecture configurations 238. The base station data 236 represents, for example, network scheduling data, radio resource management data, beamforming codebooks, software application configuration information, and the like. The one or more neural network architecture configurations 238 include one or more data structures containing data and other information representative of a corresponding architecture and/or parameter configurations used by the base station neural network manager 234 to form a corresponding neural network of the base station 108. Similar to the neural network architectural configuration 218 of the UE 110, the information included in a neural network architectural configuration 238 includes, for example, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network architecture configuration 238 includes any combination of NN formation configuration elements that can be used to create a NN formation configuration that defines and/or forms a DNN or other neural network.

In at least one embodiment, the software stored in the memory 232 further includes a training module 240 that operates to train one or more neural networks implemented at the base station 108 or the UE 110 using one or more sets of input data. This training can be performed for various purposes, such as processing communications transmitted over a wireless communication system, such as encoding downlink communications, modulating downlink communications, demodulating downlink communications, decoding downlink communications, encoding uplink communications, modulating uplink communications, demodulating uplink communications, and decoding uplink communications). The training can include training neural networks while offline (that is, while not actively engaged in processing the communications) and/or online (that is, while actively engaged in processing the communications).

In some embodiments, the base station 108 further includes an inter-base station interface 242, such as an Xn or X2 interface, which the base station manager 233 configures to exchange user-plane, control-plane, and other information between other base stations, and to manage the communication of the base station 108 with the UE 110. The base station 108 further can include a core network interface 244 that the base station manager 233 configures to exchange user-plane, control-plane, and other information with core network functions and/or entities.

Figure 3:
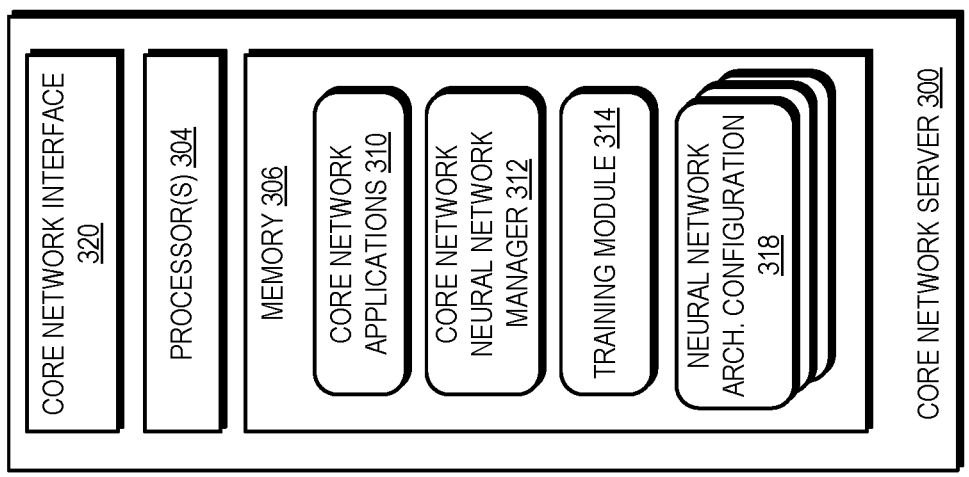
FIG. 3 is a diagram illustrating an example configuration of a core network server for training and configuring the base station and the UE of FIG. 2 in accordance with some embodiments.

FIG. 3 illustrates an example hardware configuration of a core network server 300 implemented in, for example, the core network 102 of FIG. 1. Note that the depicted hardware configuration represents the processing components and communication components most directly related to the neural network-based transmission feedback processes described herein and omit certain components well-understood to be frequently implemented in servers in a core network. In the depicted configuration, the core network server 300 provides all or part of a function, entity, service, and/or gateway in the core network 102. Each function, entity, service, and/or gateway in the core network 102 can be provided as a service in the core network 102, distributed across multiple servers or embodied on a dedicated server. For example, the core network server 300 can provide all or a portion of the services or functions of a User Plane Function (UPF), an Access and Mobility Management Function (AMF), a Serving Gateway (S-GW), a Packet Data Network Gateway (P-GW), a Mobility Management Entity (MME), an Evolved Packet Data Gateway (ePDG), and the like. The core network server 300 is illustrated as being embodied on a single server that includes one or more processors 304 and one or more non-transitory computer-readable storage media 306 (also referred to herein as "memory 306").

The memory 306 stores one or more core network applications 310, which implement various core network functions, such as the aforementioned UPF, AMF, S-GW, P-GW, MME, and ePDG. The memory 306 further includes a core network neural network manager 312 that manages one or more neural network architecture configurations 318 used to process communications exchanged between UE 110 and the base station 108. In some implementations, the core network neural network manager 312 analyzes various parameters, such as current signal channel conditions (as reported by base stations, access points, and UEs), capabilities at a base station (e.g., antenna configurations, cell configurations, MIMO capabilities, radio capabilities, and processing capabilities), capabilities of UEs (e.g., antenna configurations, MIMO capabilities, radio capabilities, and processing capabilities), and so forth. For example, each base station 108 in the network 100 obtains various parameters during the communications with the UEs camped on the associated cell and forwards the parameters to the core network neural network manager 312. The core network neural network manager 312 selects, based on these parameters, a neural network architecture configuration 318 that improves the accuracy of a neural network processing the communications. Improving the accuracy signifies an improved accuracy in the output, such as lower bit errors, generated by the neural network relative to a neural network configured with another neural network architecture configuration 318. The core network neural network manager 312 then communicates the selected NN formation configuration to one or both of the base station 108 and the UE 110. Further, the core network neural network manager 312 can receive UE and/or BS feedback from the base station 108 and select an updated neural network architecture configuration 318 based on the feedback.

In some embodiments, the memory 306 further stores a training module 314 for training and re-training one or more of the neural network architecture configurations 318 in addition to, or instead of, the training provided by the training module 240 (FIG. 1) of the base station 108 using the techniques described below. The core network server 302 also can a core network interface 320 for communication of user-plane, control-plane, and other information with the other functions or entities in the core network 102, base station 108, or UE 110. To illustrate, the core network server 302 communicates neural network architecture configurations 318 to the base station 108 using the core network interface 320.

Figure 4:
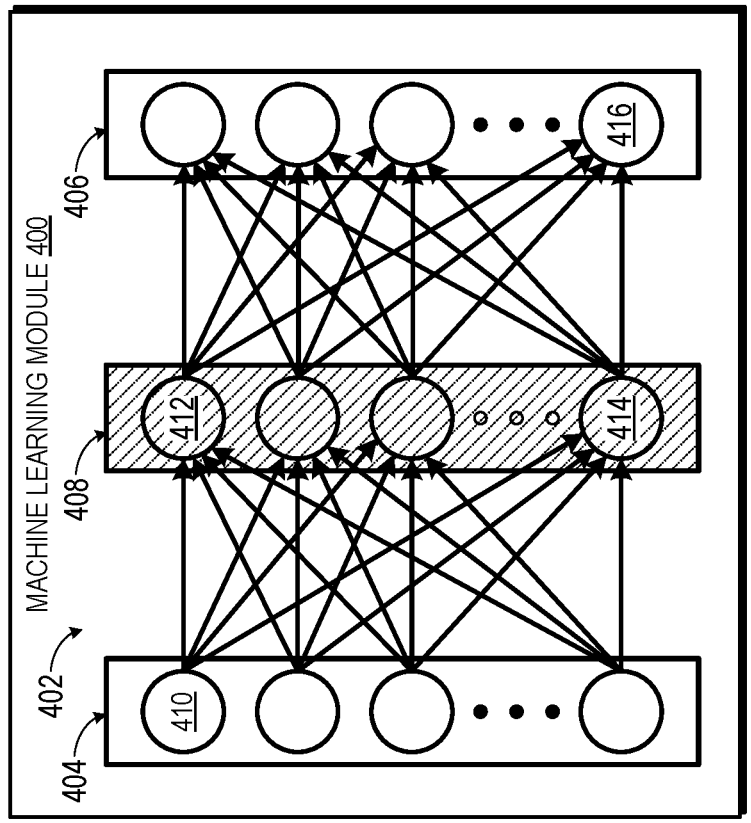
FIG. 4 is a diagram illustrating a machine learning module employing at least one neural network for use in a neural network-based transmission feedback scheme in accordance with some embodiments.

FIG. 4 illustrates an example machine learning (ML) module 400 for implementing a neural network in accordance with some embodiments. As described herein, one or both of the base station 108 and the UE 110 implement one or more DNNs or other neural networks in one or both of the transmit processing paths or receive processing paths for processing incoming and outgoing wireless communications. The ML module 400 therefore illustrates an example module for implementing one or more of these neural networks.

In the depicted example, the ML module 400 implements at least one deep neural network (DNN) 402 with groups of connected nodes (e.g., neurons and/or perceptrons) that are organized into three or more layers. The nodes between layers are configurable in a variety of ways, such as a partially-connected configuration where a first subset of nodes in a first layer are connected with a second subset of nodes in a second layer, a fully-connected configuration where each node in a first layer is connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based upon adaptive learning. Using the DNN 402, the ML module 400 performs a variety of different types of analysis, including single linear regression, multiple linear regression, logistic regression, step-wise regression, binary classification, multiclass classification, multivariate adaptive regression splines, locally estimated scatterplot smoothing, and so forth.

In some implementations, the ML module 400 adaptively learns based on supervised learning. In supervised learning, the ML module receives various types of input data as training data. The ML module 400 processes the training data to learn how to map the input to a desired output. As one example, the ML module 400 receives digital samples of a signal as input data and learns how to map the signal samples to binary data that reflects information embedded within the signal. As another example, the ML module 400 receives binary data as input data and learns how to map the binary data to digital samples of a signal with the binary data embedded within the signal. Still further, as another example and as described in greater detail below, the ML module 400 receives signal samples as input data and learns how to generate a non-binary, or "soft", transmission feedback signal or, conversely, receives data representative of a soft transmission feedback signal and learns from this input whether data needs to be retransmitted, and in some cases which portions of data need to be transmitted. During a training procedure, the ML module 400 uses labeled or known data as an input to the DNN 402. The DNN 402 analyzes the input using the nodes and generates a corresponding output. The ML module 400 compares the corresponding output to truth data and adapts the algorithms implemented by the nodes to improve the accuracy of the output data. Afterward, the DNN 402 applies the adapted algorithms to unlabeled input data to generate corresponding output data.

The ML module 400 uses one or both of statistical analyses and adaptive learning to map an input to an output. For instance, the ML module 400 uses characteristics learned from training data to correlate an unknown input to an output that is statistically likely within a threshold range or value. This allows the ML module 400 to receive complex input and identify a corresponding output. Some implementations train the ML module 400 on characteristics of communications transmitted over a wireless communication system (e.g., time/frequency interleaving, time/frequency deinterleaving, convolutional encoding, convolutional decoding, power levels, channel equalization, inter-symbol interference, quadrature amplitude modulation/demodulation, frequency-division multiplexing/de-multiplexing, transmission channel characteristics). This allows the trained ML module 400 to receive samples of a signal as an input, such as samples of a downlink signal received at a UE, and recover information from the downlink signal, such as the binary data embedded in the downlink signal.

Further, in some embodiments, the characteristics of the communications used to train the ML module 400 includes aspects pertaining to providing transmission feedback, such as ACK/NACK or HARQ-type feedback so that the ML module(s) 400 of the data-receiving device are trained to provide a probabilistic or other non-binary transmission feedback to the data-sending device representing the success in recovering transmitted data from a transmission from the data-sending device to the data-receiving device, and further so that the ML module(s) 400 of the data-sending device are trained to process such transmission feedback in deciding whether to include some or all of the previously-transmitted data in the next transmission.

In the depicted example, the DNN 402 includes an input layer 404, an output layer 406, and one or more hidden layers 408 positioned between the input layer 404 and the output layer 406. Each layer has an arbitrary number of nodes, where the number of nodes between layers can be the same or different. That is, the input layer 404 can have the same number and/or a different number of nodes as output layer 406, the output layer 406 can have the same number and/or a different number of nodes than the one or more hidden layer 408, and so forth.

Node 410 corresponds to one of several nodes included in input layer 404, wherein the nodes perform separate, independent computations. As further described, a node receives input data, and processes the input data using one or more algorithms to produce output data. Typically, the algorithms include weights and/or coefficients that change based on adaptive learning. Thus, the weights and/or coefficients reflect information learned by the neural network. Each node can, in some cases, determine whether to pass the processed input data to one or more next nodes. To illustrate, after processing input data, node 410 can determine whether to pass the processed input data to one or both of node 412 and node 414 of hidden layer 408. Alternatively or additionally, node 410 passes the processed input data to nodes based upon a layer connection architecture. This process can repeat throughout multiple layers until the DNN 402 generates an output using the nodes (e.g., node 416) of output layer 406.

A neural network can also employ a variety of architectures that determine what nodes within the neural network are connected, how data is advanced and/or retained in the neural network, what weights and coefficients are used to process the input data, how the data is processed, and so forth. These various factors collectively describe a neural network architecture configuration, such as the neural network architecture configurations 218, 238, and 318 briefly described above. To illustrate, a recurrent neural network, such as a long short-term memory (LSTM) neural network, forms cycles between node connections to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that a neural network architecture configuration can include a variety of parameter configurations that influence how the DNN 402 or other neural network processes input data.

A neural network architecture configuration of a neural network can be characterized by various architecture and/or parameter configurations. To illustrate, consider an example in which the DNN 402 implements a convolutional neural network (CNN). Generally, a convolutional neural network corresponds to a type of DNN in which the layers process data using convolutional operations to filter the input data. Accordingly, the CNN architecture configuration can be characterized by, for example, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternatively or additionally, the pooling parameter specifies how and where in the layers of data processing the neural network pools data. A pooling parameter that indicates "max pooling," for instance, configures the neural network to pool by selecting a maximum value from the grouping of data generated by the nodes of a first layer, and use the maximum value as the input into the single node of a second layer. A pooling parameter that indicates "average pooling" configures the neural network to generate an average value from the grouping of data generated by the nodes of the first layer and use the average value as the input to the single node of the second layer.

A kernel parameter indicates a filter size (e.g., a width and a height) to use in processing input data. Alternatively or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network.

Weight parameters specify weights and biases used by the algorithms within the nodes to classify input data. In some implementations, the weights and biases are learned parameter configurations, such as parameter configurations generated from training data.

A layer parameter specifies layer connections and/or layer types, such as a fully-connected layer type that indicates to connect every node in a first layer (e.g., output layer 406) to every node in a second layer (e.g., hidden layer 408), a partially-connected layer type that indicates which nodes in the first layer to disconnect from the second layer, an activation layer type that indicates which filters and/or layers to activate within the neural network, and so forth. Alternatively or additionally, the layer parameter specifies types of node layers, such as a normalization layer type, a convolutional layer type, a pooling layer type, and the like.

While described in the context of pooling parameters, kernel parameters, weight parameters, and layer parameters, it will be appreciated that other parameter configurations can be used to form a DNN consistent with the guidelines provided herein. Accordingly, a neural network architecture configuration can include any suitable type of configuration parameter that can be applied to a DNN that influences how the DNN processes input data to generate output data.

In some embodiments, the configuration of the ML module 400 is based on a current operating environment. To illustrate, consider an ML module trained to generate binary data from digital samples of a signal. A transmission environment oftentimes modifies the characteristics of a signal traveling through the environment. Transmission environments oftentimes change, which impacts how the environment modifies the signal. A first transmission environment, for instance, modifies a signal in a first manner, while a second transmission environment modifies the signal in a different manner than the first. These differences impact the accuracy of the output results generated by the ML module 400. For instance, the DNN 402 configured to process communications transmitted in the first transmission environment may generate errors when processing communications transmitted in the second transmission environment (e.g., bit errors that exceed a threshold value).

Accordingly, in some embodiments, the device implementing the ML module 400 generates and stores different neural network architecture configurations for different transmission environments or configurations. To this end, one or both of the base station 108 or the core network server 302 can train the ML module 400 using any combination of the base station neural network manager 234, training module 240, core network neural network manager 312, and/or training module 314. The training can occur offline when no active communication exchanges are occurring, or online during active communication exchanges. For example, the base station 108 or the core network server 302 can mathematically generate training data, access files that store the training data, obtain real-world communications data, etc. The base station 108 or core network server 302 then extracts and stores the various learned neural network architecture configurations for subsequent use. Some implementations store input characteristics with each neural network architecture configuration, whereby the input characteristics describe various properties of the transmission environment corresponding to the respective neural network architecture configurations. In implementations, a neural network manager selects a neural network architecture configurations by matching a current transmission environment and/or current operating environment to the input characteristics.

Figure 5:
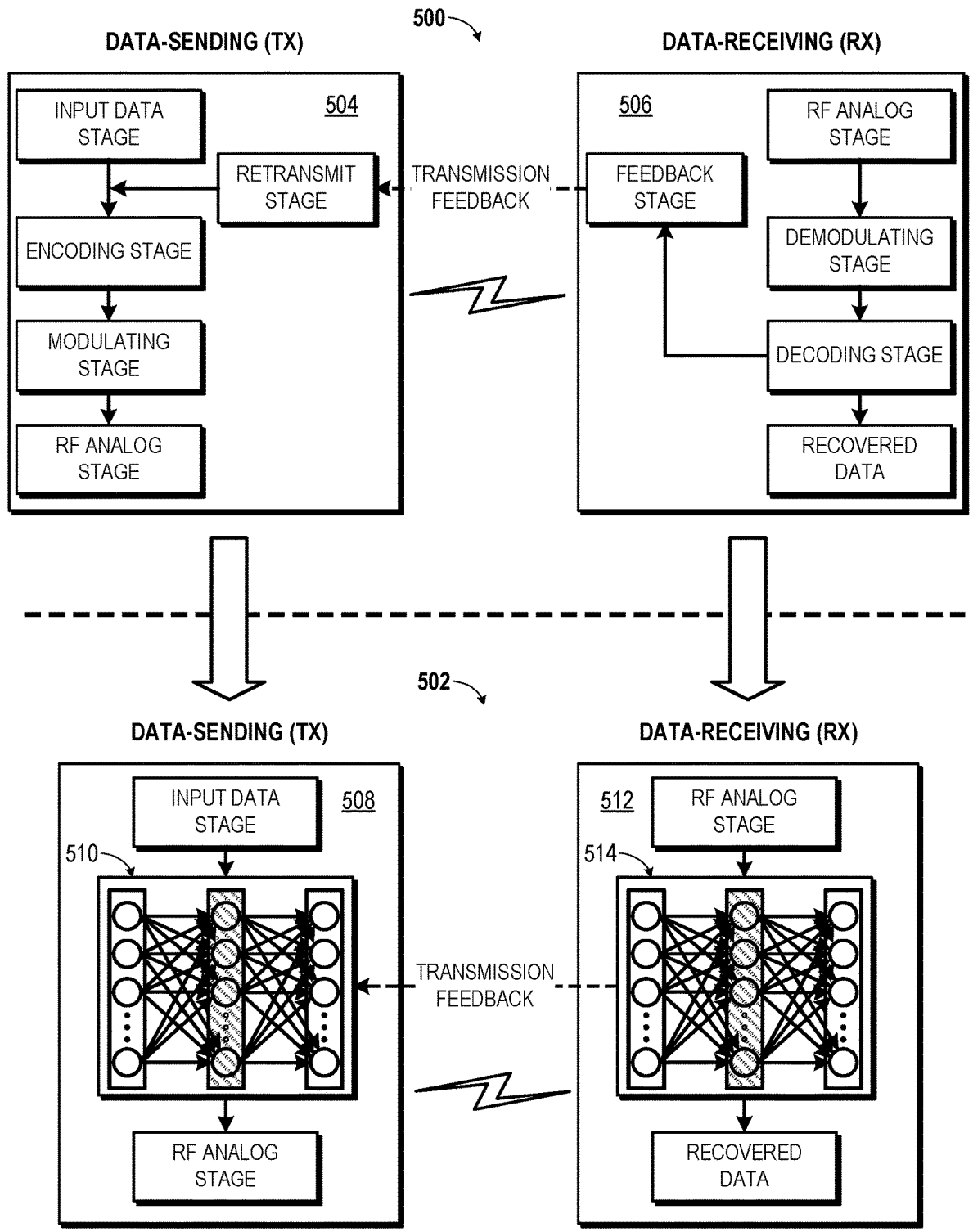
FIG. 5 is a diagram illustrating a replacement of individual functional blocks of transmitter and receiver processing paths with corresponding processing modules employing neural networks in accordance with some embodiments.

Turning now to FIG. 5, an example approach to utilizing ML modules, and in particular, DNNs or other neural networks, in the base station 108 and UE 110 in place of conventional hard-coded or fixed signal processing paths is illustrated in accordance with some embodiments. As noted above, wireless communication systems typically include a variety of complex components and functions, including the conversion of digital data to RF signals at a data-sending device, the recovery of the digital data from received RF signals at the data-receiving device, as well as the provision of transmission feedback so that an error in the data transmission and recovery process can be redressed via retransmission of at least part of the original data. This functionality generally can be divided into two processing paths at each of the data-sending device and the data-receiving device: a transmit (TX) processing path to convert data and other inputs to RF signals for output and a receive (RX) processing path to convert RF signals to corresponding data other outputs, some of which may then serve as inputs to the co-located control signal path (e.g., as transmission feedback).

To demonstrate, FIG. 5 depicts example diagrams 500 and 502, each of which represents example processing paths utilized by a data-sending device and a data-receiving device in the network 100 of FIG. 1. For downlink transmissions, the base station 108 is the data-sending device, while the UE 110 is the data-receiving device. Conversely, for uplink transmissions, the UE 110 is the data-sending device, while the base station 108 is the data-receiving device. As such, which of the base station 108 and the UE 110 constitutes the data-sending device and which constitutes the data-receiving device is dependent on which of these two devices is serving as the originating source of data being transmitted.

Diagram 500 represents a transmitter block 504 and a receiver block 506 as conventionally implemented at a data-sending device and a data-receiving device, respectively. The transmitter block 504 includes a transmitter processing path that progresses from top to bottom. The transmitter processing path begins with input data that progresses to an encoding stage, followed by a modulating stage, and then RF analog transmit (TX) stage.

The encoding stage can include any type and number of encoding stages employed by a device to transmit data over the wireless communication system. To illustrate, an example encoding stage receives binary data as an input and processes the binary data using various encoding algorithms to append information to the binary data, such as frame information. Alternatively or additionally, the encoding stage transforms the binary data, such as by applying forward error correction that adds redundancies to help information recovery at a receiver. As another example, the encoding stage converts the binary data into symbols.

The modulating stage receives an output generated by the encoding stage as input and embeds the input onto a signal. For instance, the modulating stage generates digital samples of signal(s) embedded with the input from the encoding stage. Thus, in transmitter block 504, the encoding stage and the modulating stage represent a high-level transmitter processing path that oftentimes includes lower-level complex functions, such as convolutional encoding, serial-to-parallel conversion, cyclic prefix insertion, channel coding, time/frequency interleaving, and so forth. The RF analog TX stage receives the output from the modulating stage, generates an analog RF signal based on the modulating stage output, and transmits the analog RF signal to the receiver block 506.

The receiver block 506 implements a receiver processing path that performs complementary processing relative to the transmitter processing path of the transmitter block 504. The receiver processing path illustrated in receiver block 506 progresses from top to bottom and includes an RF analog receive (RX) stage, followed by a demodulating stage, and a decoding stage. The RF analog RX stage receives signals transmitted by the transmitter block 504 and generates an input used by the demodulating stage. As one example, the RF analog RX stage includes a down-conversion component and/or an analog-to-digital converter (ADC) to generate samples of the received signal. The demodulating stage processes input from the RF analog Rx stage to extract data embedded on the signal (e.g., data embedded by the modulating stage of the transmitter block 504). The demodulating stage, in turn, recovers symbols and/or binary data.

The decoding stage receives input from the demodulating stage, such as recovered symbols and/or binary data, and processes the input to recover the transmitted information. To illustrate, the decoding stage extracts payload data from frames and/or slots, and so forth. Thus, the decoding stage generates the recovered information.

As the transmitter block 504 communicates data and other information to the receiver block 506 via RF signals, and as these RF signals are subject to interference and other perturbations that may sufficiently modify the RF signals so that the "information" recovered from the modified RF signals by the receiver block 506 does not correctly reflect the transmitted information. The transmitter processing path and the receiver processing path together implement a transmission feedback scheme in which the encoding stage of the transmitter processing path encodes the data to be transmitted using forward error correction (FEC), parity bits, or other error-detecting and/or correcting code, the decoding stage of the receiver processing path attempts to decode the encoded data recovered from the received RF signaling, and a retransmit stage of the receiver processing path provides transmission feedback, such as in the form of an ACK/NACK signal or HARQ feedback signals, for wireless transmission back to the transmitter block 504 using a corresponding control signal processing path at the data-receiving device. A receiver processing path at the data-transmitting device recovers the control signal feedback, whereby a retransmit stage of the transmission processing path of the data-sending device utilizes the transmission feedback to direct the input, encoding, modulating, and RF analog stages to retransmit at least a portion of the previous data when the transmission feedback indicates that the previous transmission of this data was not correctly received at the receiver block 506.

As noted, the transmitter and receiver processing paths illustrated by transmitter block 504 and receiver block 506 have been simplified for clarity and can include multiple complex modules. These complex modules are specific to particular functions or conditions. Consider, for example, a receiver processing path that processes Orthogonal Frequency Division Modulation (OFDM) transmissions. To recover information from OFDM transmissions, the receiver block oftentimes includes multiple processing blocks, each of which is dedicated to a particular function, such as an equalization block that corrects for distortion in a received signal, a channel estimation block that estimates transmission channel properties to identify the effects of scattering, power decay, and so forth, on a transmission, etc. At high frequencies, such as frequencies in the 6 GHz or terahertz (THz) band, these blocks can be resource intensive and require complex hardware implementations. Further, implementing blocks that generate outputs with an accuracy within a desired threshold oftentimes requires more specific and less flexible components. To illustrate, an equalization block that functions for signals in the 6 GHz band may not perform with the same accuracy at other frequency bands, thus necessitating different equalization blocks for different bands and adding complexity to the corresponding devices.

Rather than implement the transmitter and receiver processing paths as chains of separate and complex functional blocks that require individual design, testing, and implementation efforts, in at least some embodiments, the transmitter and receiver processing paths employ one or more DNNs or other neural networks (using instances of the ML module 400, FIG. 4) in place of some or all of these individual blocks. Block diagram 502 illustrates this approach, in which a transmitter block 508 includes one or more DNNs 510 in the transmitter processing path, while a receiver block 512 includes one or more DNNs 514 in the receiver processing path, with each DNN 510, 514 providing the functionality of at least part of at least one of the traditionally separate blocks of the corresponding processing path. To illustrate, in the depicted example the one or more DNNs 510 in the transmitter block 508 correspond to the encoding stage, the modulating stage, and the retransmit stage of transmitter block 504. It is to be appreciated, however, that the DNN 510 can perform any high-level or low-level operation found within the transmitter processing chain. As one example, a first DNN 510 performs low-level transmitter-side forward error correction, a second DNN 510 performs low-level transmitter-side convolutional encoding, and so forth. Alternatively or additionally, the DNNs 510 perform high-level processing, such as full-transmitter chain processing that corresponds to the encoding stage and the modulating stage of transmitter block 508. Similarly, the one or more DNNs 514 in the receiver block 512 perform, for example, the functions attributed to the demodulating stage, the decoding stage, and the transmission feedback stage. The one or more DNNs 514 can perform any high-level or low-level operation found within the receiver processing path, such as low-level receiver-side bit error correction, low-level receiver-side symbol recovery, high-level full-receiver chain demodulating and decoding, etc. As such, DNNs in wireless communication networks can be configured to replace one or both of high-level operations or low-level operations in transmitter and receiver processing paths. As described below, these DNNs can be reconfigured through retraining, which provides more flexibility and adaptability to the processing paths relative to the more specific and less flexible components found in conventional implementations.

Figure 6:
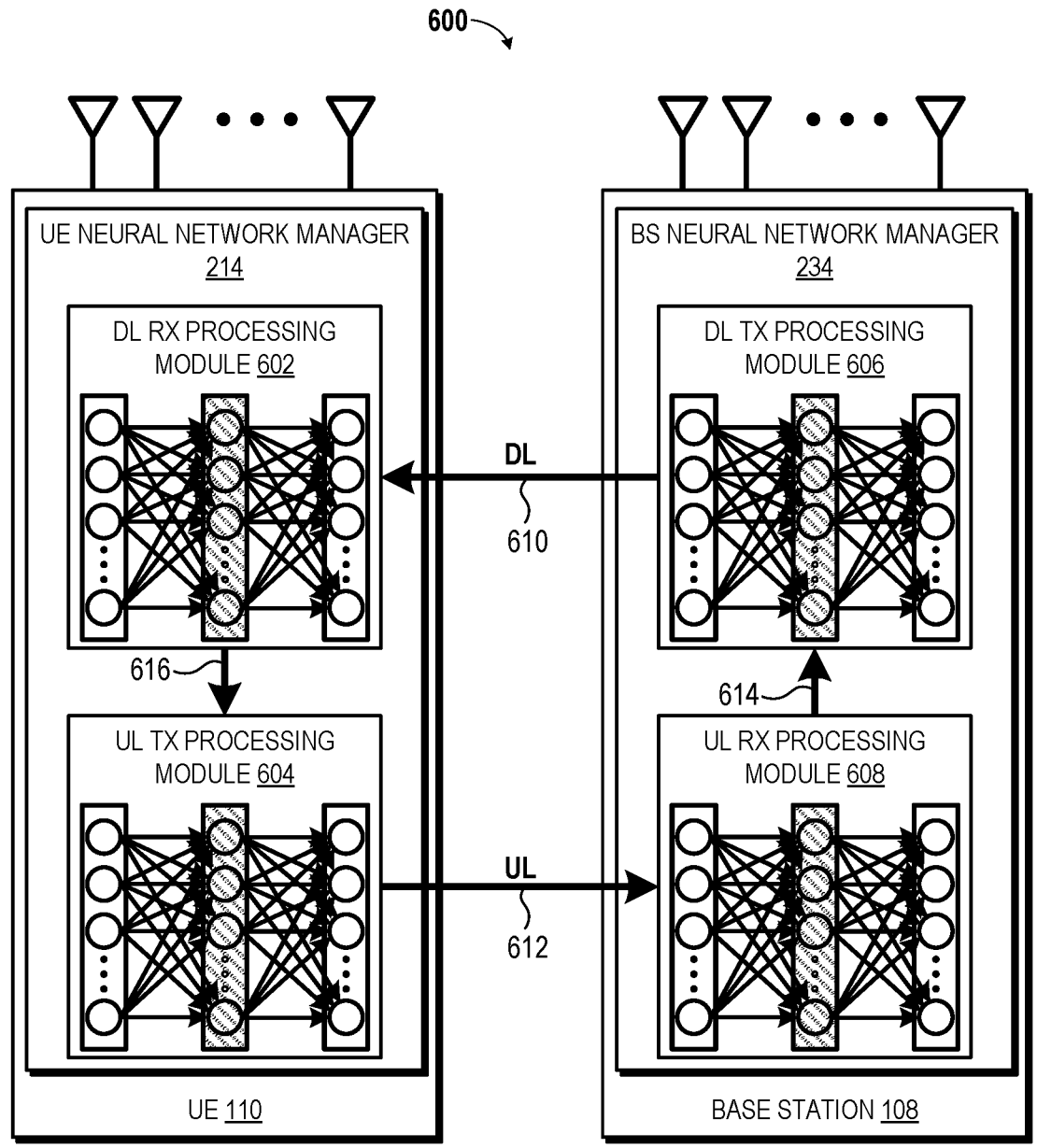
FIG. 6 is a diagram illustrating an example implementation of neural network managers of a base station and a UE in accordance with some embodiments.

As noted, network devices that are in wireless communication, such as the UE 110 and the base station 108, can be configured to process wireless communication exchanges using one or more DNNs at each network device, where each DNN replaces one or more functions conventionally implemented by one or more hard-coded or fixed-design blocks (e.g., uplink processing, downlink processing, uplink encoding processing, downlink decoding processing, transmission feedback generation, transmission feedback processing, etc.). To this end, FIG. 6 illustrates an example operating environment 600 for DNN implementation at the UE 110 and the base station 108. In the depicted example, the UE neural network manager 214 of the UE 110 implements a downlink (DL) receiver (RX) processing module 602 and an uplink (UL) transmitter processing module 604. Similarly, the base station neural network manager 234 implements a DL TX processing module 606 and a UL RX processing module 608. Each of the processing modules 602, 604, 606, 608 implements one or more DNNs via the implementation of a corresponding ML module, such as described above with reference to the one or more DNNs 402 of the ML module 400 of FIG. 4.

The DL TX processing module 606 of the base station 108 and the DL RX processing module 602 interoperate to support a DL wireless communication path 610 between the base station 108 as the data-sending device and the UE 110 as the data-receiving device, while the UL TX processing module 604 of the UE and the UL RX processing module 608 of the base station 108 interoperate to support a UL wireless communication path 612 between the UE 110 as the data-sending device and the base station 108 as the data-receiving device. As such, the one or more DNNs of the DL TX processing module 606 are trained to receive DL data and DL control-plane information as inputs and to generate corresponding outputs for transmission as RF signals via the RF analog stage (see transmitter block 508, FIG. 5) of the base station 108. The one or more DNNs of the DL RX processing module 602 conversely are trained to receive the outputs extracted from the transmitted RF signals by the RF analog stage (see receiver block 512, FIG. 5) as inputs and to generate as outputs the recovered DL data and the DL control-plane information for further processing at the UE 110 (or, in some instances, to act upon the DL control-plane information directly). In a similar manner, the one or more DNNs of the UL TX processing module 604 are trained to receive UL data and UL control-plane information as inputs and to generate corresponding outputs for transmission as RF signals via the RF analog stage of the UE 110. The one or more DNNs of the UL RX processing module 608 conversely are trained to receive the outputs extracted from the transmitted RF signals by the RF analog stage as inputs and to generate as outputs the recovered UL user-plane data and the UL control-plane information for further processing at the base station 108.

In the course of performing these uplink and downlink communications, one or more errors may be introduced, either in the transmission of the RF signals themselves or in the formation of the RF signals at the data-sending device or the interpretation of the RF signals at the data-receiving device. To facilitate robust recovery from such errors, the processing modules 602, 604, 606, and 608 together implement DL and UL transmission feedback loops to permit the UE 110 to provide some form of ACK/NACK signal, HARQ signal, or another DL transmission feedback signal to the base station 108 that indicates whether the most-recently transmitted DL data block was received and recovered successfully so that the base station 108 can selectively retransmit at least part of this DL data block based on the DL transmission feedback signal, and to likewise permit the base station 108 to provide some form of ACK/NACK, HARQ, or another UL transmission feedback signal to the UE 110 that indicates whether the most-recently transmitted UL data block was received and recovered successfully so that the UE 110 can selectively retransmit at least part of this UL data block based on the UL transmission feedback signal.

To facilitate this robust retransmission process, the base station neural network manager 234 implements a transmission recovery feedback path 614 between the UL RX processing module 608 and the DL TX processing module 606, while the UE neural network manager 214 implements a transmission recovery feedback path 616 between the DL RX processing module 602 and the UL TX processing module 604. While processing a transmission wirelessly communicated from the corresponding TX processing module 604, 606 the DNN(s) of the RX processing modules 602, 608 are trained or otherwise configured to generate a "soft" transmission feedback signal indicating a differentiable, or "soft", probability or other representation of the likelihood that the RX processing module will be able to fully recover the data block represented in the transmission and provide the soft transmission feedback signal to the TX processing module of the same device via the transmission recovery feedback path connecting the two processing modules. The one or more DNNs of the TX processing module, in turn, is trained or otherwise configured to incorporate the soft transmission feedback signal into a control-plane transmission that is wirelessly communicated to the other device. This RX processing module at the other device is trained or otherwise configured to process the control-plane transmission to generate a retransmit control signal that is provided to the RX processing module of the same device via the transmission recovery feedback path. While preparing to generate a transmission for wireless communication to the corresponding RX processing module of the other device, the DNN(s) of the TX processing modules are trained or otherwise configured to process the retransmit control signal to selectively retransmit at least a portion of the previously-transmitted data block by selectively forming the outgoing data-plane transmission to include one or more portions of the data block based on the retransmit control signal. The uplink and downlink transmission feedback loops implemented by the DNNs of the processing modules 602, 604, 606, and 608 of the UE 110 and the base station 108 is described in greater detail below with reference to FIGS. 8 and 9.

Figure 7:
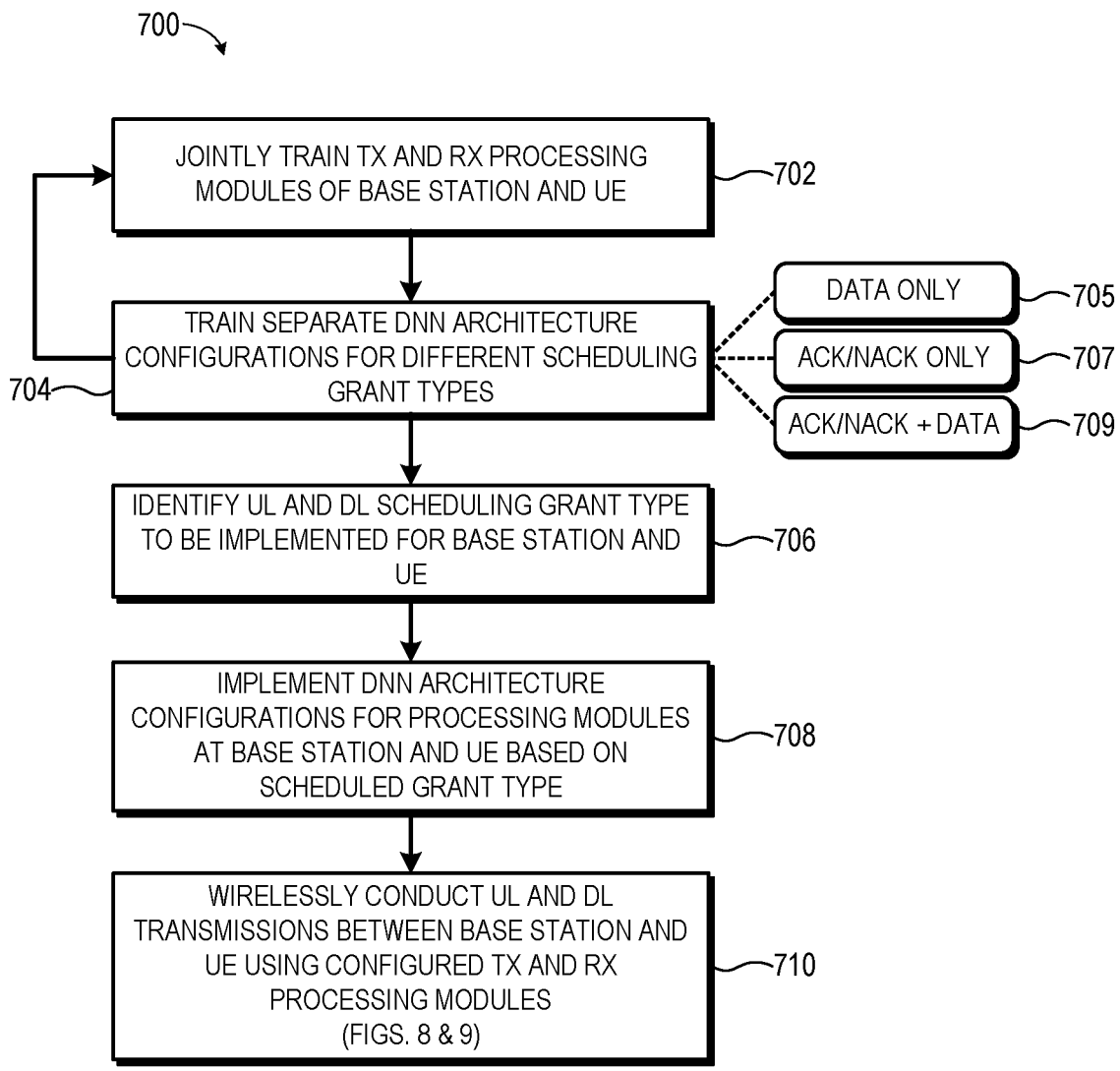
FIG. 7 is a flow diagram illustrating an example method for joint training and initial configuration of neural networks of a base station and a UE in accordance with some embodiments.

As explained above, in various embodiments certain functions of the transmitter processing path and the receiver processing path of each of the base station 108 and the UE 110 are implemented using DNNs or other neural networks. This neural network-based approach provides flexibility in design and facilitates efficient updates relative to conventional per-block design and text approaches. However, before the DNNs can be deployed and put into operation, they typically are trained or otherwise configured to provide suitable outputs for a given set of one or more inputs. To this end, FIG. 7 illustrates an example method 700 for initializing the DNN-based processing paths of the UE 110 and 108 prior to active operation for wireless communication in accordance with some embodiments. Note that the order of operations described with reference to FIG. 7 are for illustrative purposes only, and that a different order of operations may be performed, and further that one or more operations may be omitted or one or more additional operations included in the illustrated method.

The method 700 initiates at block 702 with the joint training of the DNNs of the processing modules 602, 604 of the UE 110 along with the processing modules 606, 608 of the base station 108. In some embodiments, the training module 240 of the base station 108 manages the joint training, whereas in other embodiments the training module 314 of the core network server 300 manages the joint training. In either approach, this joint training typically involves initializing the bias weights and coefficients of the various DNNs with initial values, which generally are selected pseudo-randomly, inputting a set of training data (representing, for example, known user-plane data and control-plane information) at a TX processing module of a first device (e.g., the base station 108), wirelessly transmitting the resulting output as a transmission to the RX module of a second device (e.g., the UE 110), processing the transmission at the RX processing module of the second device, determining an error between the actual result output and the expected result output, and backpropagating the error throughout the DNNs of both the TX processing module of the first device and the RX processing module of the second device, and repeating the process for the next set of input data. This process repeats until a certain number of training iterations have been performed or until a certain minimum error rate has been achieved. This same process is performed between the TX processing module of the second device and the RX processing module of the first device. Further, as described herein, the RX processing module of one device generates transmission feedback that is incorporated into a control signal wirelessly communicated to the data-sending device, and the RX processing module of the data-sending device processes this control signal to provide a retransmit control signal for the TX processing module of the data-sending device. As such, the joint training process involves training the DNNs of the various processing modules to implement this feedback loop as well. For example, the joint training can include joint training of the one or more DNNs of the RX processing module and TX processing module of one device (e.g., the base station 108) and the one or more DNNs of the RX processing module and TX processing module of the other device (e.g., the UE 110).

As noted above, the joint training process can be performed while the processing modules of the base station 108 and the UE 110 are offline (that is, while no active communications of control information or user-plane data are occurring) or while the processing modules of the base station 108 and the UE 110 are online (that is, while active communications of control information or user-plane data are occurring). Further, in some embodiments, rather than training all of the DNNs jointly, in some instances, a subset of the DNNs can be trained or retrained while other DNNs are maintained as static. To illustrate, the base station neural network manager 234 may detect that a particular processing module, such as the UE DL TX processing module 606, is operating inefficiently or incorrectly due to, for example, the presence of an interferer near the UE 110, and thus the base station neural network manager 234 may schedule individual retraining of the DNN(s) of the UE DL TX processing module 606 while maintaining the other DNNs of the other processing modules 602, 604, 608 in their present configurations.

As a result of the joint or individual training of the DNNs of the base station 108 and UE 110, each DNN has a particular neural network architectural configuration, or DNN architectural configuration in instances in which the implemented neural networks are DNNs, that characterizes the architecture and parameters of corresponding DNN, such as the number of hidden layers, the number of nodes at each layer, connections between each layer, the weights, coefficients, and other bias values implemented at each node, and the like.

With respect to user-plane data and control-plane transmission feedback information, a wireless transmission from the base station 108 to the UE 110 or from the UE 110 to the base station 108 can represent, for example, any one of three scheduling grant types: a wireless transmission containing user-plane data but no transmission feedback information (that is, a grant to transmit user-plane data only as represented by block 705); a wireless transmission containing transmission feedback information but no user-plane data (that is, a grant to transmit control information only as represented by block 707); and a wireless transmission containing both user-plane data and transmission feedback information (that is, a grant to transmit both control information and user-plane information as represented by block 709). It will be appreciated that the resulting configuration of a DNN resulting from joint or individual training may be based at least in part on which of these three scheduling grant types was implemented in the training process. Thus, to better ensure that the DNN-based transmitter and receiver processing paths can operate under any of these three scheduling grant types, in some embodiments the joint training process of block 702 is repeated for each scheduling grant type as represented. That is, as represented by block 704 the DNNs are jointly trained using training data that represents user-data-only transmissions to generate DNN architecture configurations specific to a user-data-only scheduling grant configuration, jointly trained using training data that represents feedback-information-only transmissions to generate DNN architecture configurations specific to a transmission-feedback-only scheduling grant configuration, and jointly trained again using training data that represents transmissions with both user data and transmission feedback to generate DNN architecture configurations specific to scheduling grants that provide for the inclusion of both data and transmission feedback.

With the DNNs trained and one or more DNN architecture configurations determined for each DNN, the base station 108 and the UE 110 are ready to initiate DL and UL wireless transmissions using the trained DNNs. In embodiments in which different DNN architectures configurations have been developed for different operating environments or configurations, such as for the aforementioned different scheduling grant types, the base station neural network manager 234 determines the operating environment that will be present or configured for one or more upcoming transmissions between the base station 108 and the UE 110 at block 708. For example, the base station neural network manager 234 can determine which scheduling grant type will be configured for communications between the base station 108 and the UE 110. At block 710, the base station neural network manager 24 directs the implementation of the DNN architecture configurations for the DNNs at the base station 108 and the UE 110 that are associated with the indicated operating environment, such as the indicated scheduling grant type. This can include signaling an identifier of the scheduling grant type or other operating environment or identifiers of the specific DNN architecture configurations to the UE 110 via, for example, Layer 1, Layer 2, or Layer 3 control signaling between the base station 108 and the UE 110. Otherwise, if operating environment-specific DNN architecture configurations are not implemented, the processes of blocks 706 and 708 may be skipped or otherwise omitted.

With the DNNs configured with their respective DNN architecture configurations, at block 710 the base station 108 and the UE 110 conduct wireless communications via the generation and communication of a wireless transmission using the DNNs of a data-sending device and corresponding reception and processing the wireless transmission using the DNNs of the data-receiving device. This process, including the incorporation of soft transmission feedback, is described in greater detail below with reference to FIGS. 8 and 9.

Figure 8:
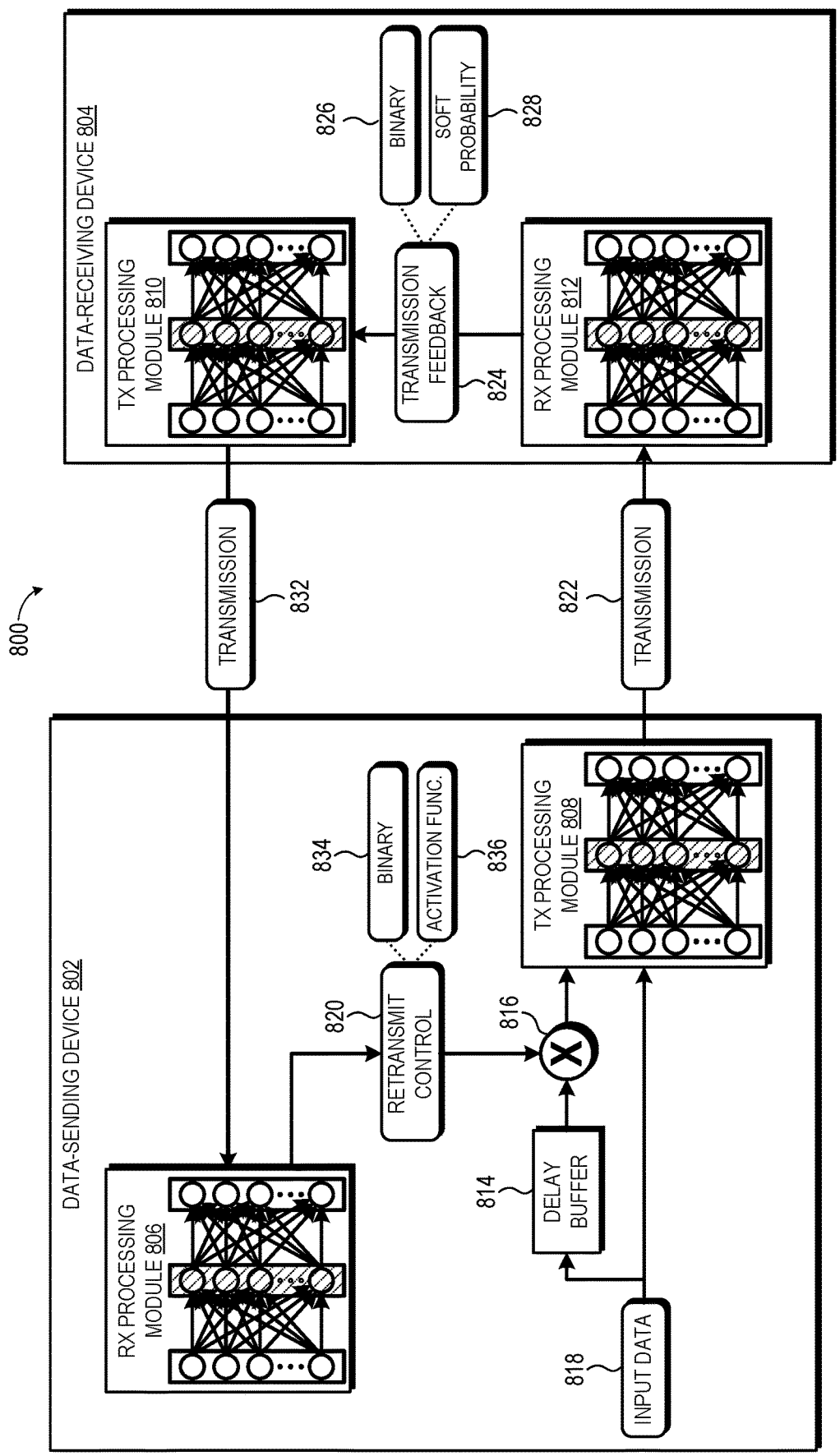
FIG. 8 is a diagram illustrating implementation of transmit (TX) and receive (RX) processing modules of a data-sending device and a data-receiving device in accordance with some embodiments.

FIG. 8 illustrates an example operating environment 800 of a data-sending device 802 and a data-receiving device 804 employing DNN-based transmission feedback in accordance with some embodiments. For downlink transmissions, the data-sending device 802 represents the base station 108 and the data-receiving device 804 represents the UE 110. Conversely, for uplink transmissions the data-sending device 802 represents the UE 110 and the data-receiving device 804 represents the base station 108. Thus, it will be appreciated that the base station 108 implements both the components of the data-sending device 802 for downlink transmissions and the components of the data-receiving device 804 for uplink transmissions, whereas the UE 110 implements both the components of the data-receiving device 804 for downlink transmissions and the components of the data-sending device 802 for uplink transmissions.

As similarly described above with reference to FIG. 6, the data-sending device 802 includes an RX processing module 806 and a TX processing module 808 and the data-receiving device 804 includes a TX processing module 810 and an RX processing module 812. Each of the processing modules 806, 808, 810, 812 includes one or more DNNs (using, e.g., ML modules 400, FIG. 4) implementing one or more functions of a respective transmitter processing path or a receiver processing path, which are individually or jointly trained as described above. The data-sending device 802 further includes a delay buffer 814 (e.g., a HARQ buffer) implemented in one or more registers, a cache, a memory, or other storage element and a gating function 816 implemented as one or more processors executing a corresponding set of instructions, as hard-coded or programmable logic, or a combination thereof. The delay buffer 814 has an input to receive a data block (e.g., input data block 818) to be transmitted and an output to provide the buffered data block as an input to the gating function 816. The gating function 816 further includes another input to receive a retransmit control signal 820 output by the RX processing module 806, and an output connected to an input of an input layer of at least one DNN of the TX processing module 808. Although illustrated as separate from the TX processing module 808, in some embodiments the gating function 816 may be employed as part of the TX processing module 808. As described in greater detail below, the gating function 816 operates to selectively output the buffered data block in the delay buffer 814, or portions or representations thereof, as an input to one or more DNNs of the TX processing module 808 based on the retransmit control signal 820.

As a general operational overview, as each data block (input data block 818) is received for transmission, the data block is buffered at the delay buffer 814. The TX processing module 808 operates to generate a transmission 822 for wireless communication to the data-receiving device 804 based on one or more inputs, including the output from the gating function 816 (which, in some embodiments, is a vector representing either none, some portions, or all of a previous data block currently buffered in the delay buffer 814 depending on the retransmit control signal 820), the current data block to be transmitted, and the like. The one or more DNNs of the TX processing module 808 process these inputs according to their currently-implemented DNN architectural configurations to generate one or more outputs, such as one or more outputs for control plane transmission, such as a Physical Uplink Control Channel (PUCCH) transmission or Physical Downlink Control Channel (PDCCH) transmission, and one or more outputs for user data plane transmission, such as Physical Uplink Shared Channel (PUSCH) or Physical Downlink Shared Channel (PDSCH). These outputs are jointly provided as the transmission 822 for conversion to RF signals by an RF analog stage (not shown), and these RF signals are wirelessly transmitted to the data-receiving device 804.

At the data-receiving device 804, an RF analog stage (not shown) converts the RF signals to one or more digital inputs to the input layer of one or more DNNs of the RX processing module 812. The one or more DNNs of the RX processing module 812 process these inputs according to their DNN architecture configurations to generate a set of outputs that represent the recovered user-plane data and control-plane information represented by the transmission 822, or attempted recoveries of this information. However, RF signal corruption or errors may have been introduced in the RF analog stage or subsequent input processing at the data-receiving device 804. Accordingly, one or more DNNs of the RX processing module 812 are trained or otherwise configured to include in the set of outputs a transmission feedback signal 824 that represents whether the RX processing module 812 has been able to successfully recover (or is likely to successfully recover) the information represented by the transmission 822 or whether there was a failed attempt to recover at least a portion of this information.

To illustrate, as with conventional HARQ-type transmission feedback approaches, the network 100 jointly trains the transmitter and receiver DNNs to employ a form of forward error correction (FEC) or other error-detection/error-correction coding. As such, an input data block is, in effect, FEC encoded or otherwise error-encoded by the DNN(s) of the TX processing module 808, and the result is included in some form in the transmission 822. The DNN(s) of the RX processing module 812, in effect, attempt to decode the error-encoded data block to recover the input data block. In the event that the processing indicates that there is an error in the recovered data (and which was not corrected or correctable as part of the processing), the DNN(s) of the RX processing module 812 format the transmission feedback signal 824 to represent the detection of an uncorrected/uncorrectable error (that is, to represent some form of a NACK). In the event that the processing indicates that the data block was fully recovered, then the DNN(s) of the RX processing module 812 format the transmission feedback signal to represent the successful recovery of the data block (that is, to represent some form of an ACK).

In instances in which the individual or joint training of the DNNs of the RX processing module 812 results in the DNNs being able to only detect whether the recovered data block has an error, but not the location of the error, in a manner similar to use of a parity bit, then the transmission feedback signal 824 may be formatted as a simple ACK/NACK feedback signal or another binary signal (as represented by block 826) indicating either the data block was successfully recovered or not successfully recovered. In instances in which the training of the DNNs of the RX processing module 812 results in the DNNs being able to not only detect whether the recovered data block has an error but in some instances can identify which portion(s) of the data block have an error, then the transmission feedback signal 824 may be formatted as a soft probability representation or other non-binary (or soft) signal (as represented by block 828) that identifies or suggests which portions of the data block are likely not recoverable and thus will need to be retransmitted. This soft probability representation can include, for example, a sigmoid, hyperbolic tangent (tan h), or other non-linear activation function.

The TX processing module 810 receives the transmission feedback signal 824 and provides this signal as an input to the input layer of one or more DNNs. The one or more DNNs of the TX processing module 810 process this input as well as any other appropriate inputs according to their currently-implemented DNN architectural configurations to generate one or more outputs. These one or more outputs are provided as a transmission 832 for conversion to RF signals by an RF analog stage (not shown), which are wirelessly communicated to the data-sending device 802.

Back at the data-sending device 802, the RF signals representing the transmission 832 are received and processed by an RF analog stage (not shown) to convert the RF signals to one or more digital inputs to the input layer of one or more DNNs of the RX processing module 806. The one or more DNNs of the RX processing module 806 process these inputs according to their DNN architecture configurations (which may be selected based on the implemented scheduling grant type or other operating environment characteristics) to generate a set of outputs that represent the recovered user-plane data and control-plane information represented by the transmission 832. In addition to recovery (or attempted recovery) of any user-plane data, the DNN(s) of the RX processing module 806 operate to configure the retransmit control signal 820 based on a representation of the transmission feedback signal 824 included in the transmission 832 by the TX processing module 810. That is, the RX processing module 806, in effect, extracts a representation of the transmission feedback signal 824 for provision as the retransmit control signal 820.

To this end, the retransmit control signal 820 can take on a format commensurate with the format of the transmission feedback signal 824. For example, if the transmission feedback signal 824 is formatted as an ACK/NACK signal or another binary signal, the retransmit control signal 820 can likewise be formatted as a binary signal (as represented by block 834), where a first value indicates that the previously-transmitted data block was successfully recovered and thus no retransmission is needed, while a second value indicates that the previously-transmitted data block was not successfully recovered and thus needs to be retransmitted in its entirety. However, in instances in which the transmission feedback signal 824 is formatted as a soft probability representation or another differentiable signal, then the retransmit control signal 820 can likewise be formatted as a soft or differentiable signal. To illustrate, in some embodiments, the DNN of the RX processing module 806 that generates the retransmit control signal 820 is trained or otherwise configured to generate and provide a non-linear activation function as the retransmit control signal 820 (as represented by block 836). As noted above, such non-linear activation functions can include, for example a sigmoid activation function, a tan h activation function, and the like.

For a next iteration of data/control transmission by the data-sending device 802, the retransmit control signal 820 is employed as a gating signal or other control signal by the gating function 816 to selectively control whether the TX processing module 808 includes a representation of some or all of the previous data block currently buffered in the delay buffer 814 in the next transmission to be generated for wireless communication to the data-receiving device 804; that is, the TX processing module 808 selectively retransmits part or all of the most-recently-transmitted data block based on the retransmit control signal 820, which represents whether the most-recently-transmitted data block was successfully recovered at the data-receiving device 804, and in some instances, which portion(s), if any, were not successfully recovered. In instances in which the retransmit control signal 820 is a binary signal, the resulting gating signal and corresponding gating function can be to selectively pass the most-recently-transmitted data block buffered in the delay buffer 814 to an input of one or more DNNs of the TX processing module 808. In instances in which the retransmit control signal 820 is a non-linear activation function or another differentiable signal, the application of this gating signal to the buffered data block can result in, for example, the output of a vector representative of which portions of the data block are to be retransmitted. This vector then is supplied to one or more DNNs of the TX processing module 808 for use in generating the output(s) that constitute the next iteration of the transmission 822. Returning to the processing of the transmission 832 at the RX processing module 806, it is noted that transmissions from the data-receiving device 804 to the data-sending device 802 also may make use of the DNN-based soft transmission feedback process described above, and thus a similar transmit feedback process can be performed, such as by generating a transmission feedback signal based on the processing of the transmission 832 at the RX processing module 806, generating a transmission based on use of this transmission feedback signal as an input to the TX processing module 808, "extraction" of a representation of this transmission feedback signal as a retransmit control signal by the RX processing module 812, and then selective retransmission of some or all of the data represented by the transmission 832 by the TX processing module 810 based on this transmission feedback signal.

Moreover, as described above, in some embodiments a different DNN architecture configuration can be employed at the TX and RX processing modules depending on different operating environments, such as the scheduling grant type employed for transmissions between the data-sending device 802 and the data-receiving device 804 (blocks 706 and 708, FIG. 7). Thus, if the current scheduling grant provides for transmission of user-plane data along with transmission feedback or other control data, then a corresponding DNN architecture configuration is selected and deployed at a DNN of the TX processing module 810, and an input data block can be multiplexed with the transmission feedback signal 824 or otherwise provided as an input to an input layer of one or more DNNs of the TX processing module 810. Likewise, the data-sending device 802 selects a corresponding DNN architecture configuration that is trained to process both incoming user-plane data and transmission feedback as inputs for receipt and processing of one or more transmissions from the data-receiving device 804 so as to extract the relevant transmission feedback and user-plane data represented in these one or more transmissions.

Figure 9:
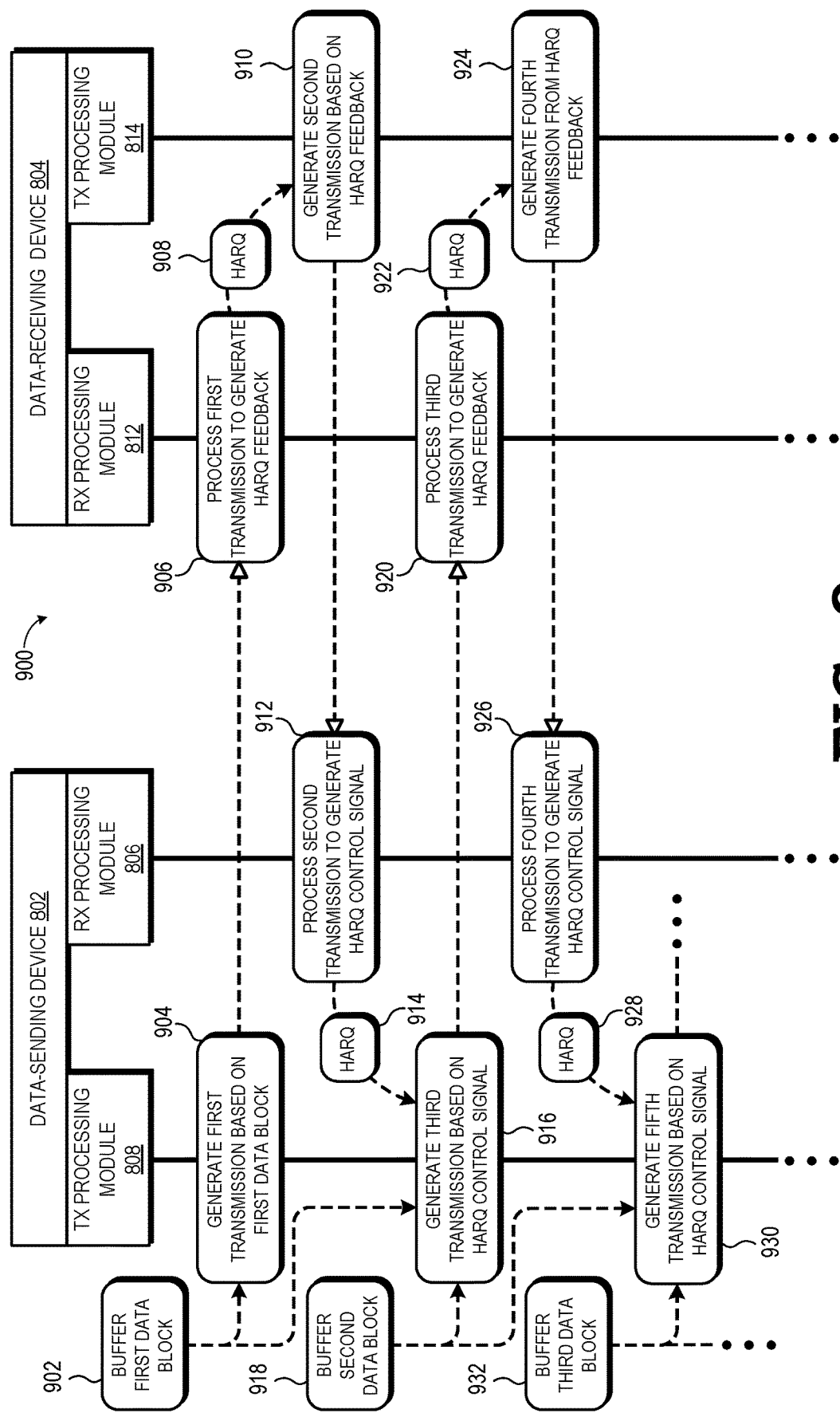
FIG. 9 is a diagram illustrating an operation of the data-sending device and data-receiving device for communicating data blocks with neural network-generated soft transmission feedback in accordance with some embodiments.

FIG. 9 illustrates a transaction diagram depicting multiple iterations of the DNN-facilitated transmission/retransmission feedback loop described above with respect to the data-sending device 802 and data-receiving device 804 of FIG. 8. For purposes of the following, it is assumed that the data-sending device 802 and the data-sending device 802 provide transmission feedback and selected data transmission in a HARQ-like process such that the transmitter DNN(s) operate to encode data blocks being transmitted using FEC or some other error-correcting code, the receiver DNN(s) thus operate to decode the received transmission based on the error-correcting code to detect and, in some instances, correct errors, and thus the transmission feedback signals and retransmit control signals are represented using soft signaling. As such, transmission feedback signals and retransmit control signals are referred to as HARQ feedback signals and HARQ control signals, respectively, for purposes of the example of FIG. 9.

At block 902, a first data block of a data stream is received at the data-sending device 802 and buffered at the delay buffer 814. At block 904, the TX processing module 808 generates a first transmission based on the first data block and the data-sending device wirelessly communicates this first transmission to the data-receiving device 804. As the first data block is the initial transmission in this exchange, there is no transmission feedback from a previous transmission to consider.

At block 906, the RX processing module 812 processes the first transmission to attempt to recover the first data block and any control information represented by the first transmission. As part of this process, the RX processing module 812 generates a HARQ feedback signal 908 (one embodiment of the transmission feedback signal 824, FIG. 8) indicating whether the data block was successfully recovered, and if not, which portion(s) were not recovered. For purposes of this example, assume that the first and last bytes of the first data block were not recovered, and the HARQ feedback signal 908 is configured accordingly.

At block 910, the TX processing module 810 generates a second transmission based on the HARQ feedback signal 908 and the data-receiving device 804 wirelessly communicates the second transmission to the data-sending device 802. At block 912, the RX processing module 806 of the data-sending device 802 processes the second transmission to extract any user-plane data and control-plane information represented by the received second transmission. As part of this process, the RX processing module 806 generates a HARQ control signal 914 (one embodiment of the retransmit control signal 820, FIG. 8) from the second transmission and which represents the HARQ feedback signal 908, and thus can include a non-linear activation function or another soft signal.

At block 916, HARQ feedback signal 908 is used as a gating signal at the gating function 816 for the first data block buffered at the delay buffer 814 to cause a vector representing the first and last bytes of the buffered initial data block to be input to the TX processing module 808. Based on this vector (and thus based on the HARQ feedback signal 908), at block 916 the TX processing module 808 provides for retransmission of the indicated first and last bytes of the initial data block via generation of a third transmission. Concurrently, at block 918 a second data block is received and then buffered at the delay buffer 814. Because the first and last bytes of the first data block are being retransmitted, the second data block is maintained in the delay buffer 814 for subsequent transmission.

The third transmission is wirelessly communicated to the RX processing module 812 and at block 920 the RX processing module 812 processes the third transmission to attempt to recover the retransmitted portions of the first data block and any control information represented by the first transmission. As part of this process, the RX processing module 812 generates a HARQ feedback signal 922 indicating whether the retransmitted portions of the first data block were successfully recovered, and if not, which portion(s) were not recovered. For purposes of this example, assume that the first and last bytes of the first data block were successfully recovered, and the HARQ feedback signal 922 is configured accordingly.

At block 924, the TX processing module 810 generates a fourth transmission based on the HARQ feedback signal 922 and the data-receiving device 804 wirelessly communicates the fourth transmission to the data-sending device 802. At block 926, the RX processing module 806 of the data-sending device 802 processes the fourth transmission to extract any user-plane data and control-plane information represented by the received fourth transmission. As part of this process, the RX processing module 806 generates a HARQ control signal 928 from the fourth transmission and which represents the HARQ feedback signal 922, and thus can include a non-linear activation function or another soft signal.

At block 930, the HARQ control signal 928 is used as a gating signal at the gating function 816 for the first data block buffered at the delay buffer 814 to cause a vector representing no retransmission of the first data block to be input to the TX processing module 808. Based on the vector (and thus based on the HARQ feedback signal 922), the TX processing module 808 provides for transmission of the buffered second data block via generation of a fifth transmission. Concurrently, at block 932 a third data block is received and then buffered at the delay buffer 814. The fifth transmission is wirelessly communicated to the data-receiving device 804, and another iteration of the transmit-receive-feedback-selectively retransmit loop as described above is performed. This process is repeated for each data block of the stream until the last data block of the stream is fully recovered at the data-receiving device 804 or until communications are otherwise terminated.

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method, in a data-sending device, comprising:
buffering a first data block in a delay buffer;
processing the first data block at a transmitter neural network of the data-sending device to generate a first transmission for wireless communication to a data-receiving device;
wirelessly communicating the first transmission to the data-receiving device;
processing a second transmission wirelessly received from the data-receiving device at a receiver neural network of the data-sending device to generate a retransmit control signal;
generating a third transmission for wireless communication to the data-receiving device by applying a gating function to the first data block in the delay buffer using the retransmit control signal as a control input and providing an output of the gating function to an input of the transmitter neural network; and
wirelessly communicating the third transmission to the data-receiving device.

2. The method of claim 1, wherein the second transmission represents a hybrid automatic repeat request (HARQ) signal from the data-receiving device.

3. The method of claim 1, wherein:
the retransmit control signal comprises a binary signal; and
generating the third transmission comprises:
generating the third transmission based on at least a portion of the first data block responsive to the binary signal having a first value; and
generating the third transmission independent of the first data block responsive to the binary signal having a second value.

4. The method of claim 1, wherein:
the retransmit control signal comprises a non-linear activation function; and
generating the third transmission to include one or more portions of the first data block based on the non-linear activation function.

5. The method of claim 1, wherein each of the transmitter neural network and the receiver neural network has a plurality of neural network architecture configurations, each neural network architecture configuration associated with a different corresponding scheduling grant type of a plurality of scheduling grant types; and
the method further comprises:
jointly training the transmitter neural network and the receiver neural network in conjunction with at least one neural network of the data-receiving device using one or more sets of training data, wherein jointly training the transmitter neural network and the receiver neural network includes individually training multiple neural network architecture configurations of the plurality of neural network architecture configurations.

6. The method of claim 5, further comprising:
determining a current scheduling grant type implemented for the data-sending device, the current scheduling grant type comprising one of a grant to transmit control information only, a grant to transmit user-plane data only, or a grant to transmit both control information and user-plane data; and
configuring the transmitter neural network and the receiver neural network to implement a neural network architecture configuration of the plurality of neural network architecture configurations that is associated with the current scheduling grant type.

7. The method of claim 1, wherein:
generating the third transmission includes generating the third transmission at the transmitter neural network further based on a second data block received subsequent to the first data block.

8. The method of claim 1, wherein:
processing the second transmission at the receiver neural network of the data-sending device further comprises processing the second transmission at the receiver neural network of the data-sending device to attempt to recover a second data block from the second transmission.

9. The method of claim 8, further comprising:
generating a transmission feedback signal at the receiver neural network of the data-sending device, the transmission feedback signal representing a status of recovery of the second data block from the second transmission; and wherein generating the third transmission further includes processing the transmission feedback signal at the transmitter neural network of the data-sending device.

10. The method of claim 9, wherein the transmission feedback signal comprises a hybrid automatic repeat request (HARQ) control signal.

11. A data-sending device comprising:
a radio frequency front end;
at least one processor coupled to the radio frequency front end; and
a non-transitory computer-readable medium storing one or more sets of instructions, the one or more sets of instructions configured to manipulate the at least one processor to perform the method of claim 1.

12. A computer-implemented method, in a data-receiving device, comprising:
receiving, at a receiver neural network of the data-receiving device, a first transmission wirelessly communicated from a data-sending device;
processing the first transmission at the receiver neural network of the data-receiving device to attempt to recover a first data block and to generate a first transmission feedback signal representative of the attempt to recover the first data block;
generating, at a transmitter neural network of the data-receiving device, a second transmission based on the first transmission feedback signal; and
wirelessly communicating the second transmission to the data-sending device.

13. The method of claim 12, wherein the second transmission represents a hybrid automatic repeat request (HARQ) signal.

14. The method of claim 12, wherein:
the first transmission feedback signal represents a failed attempt to recover the first data block; and
the method further includes:
receiving, at the receiver neural network, a third transmission wirelessly communicated from the data-sending device;
processing the third transmission at the receiver neural network of the data-receiving device to attempt to recover at least a portion of the first data block and to generate a second transmission feedback signal representative of the attempt to recover at least a portion of the first data block; and
generating, at the transmitter neural network, a fourth transmission for wireless communication to the data-sending device based on the second transmission feedback signal.

15. The method of claim 14, wherein:
each of the transmitter neural network and the receiver neural network has a plurality of neural network architecture configurations, each neural network architecture configuration associated with a different corresponding scheduling grant type of a plurality of scheduling grant types; and
the method further includes:
jointly training the transmitter neural network and the receiver neural network in conjunction with at least one neural network of the data-sending device using one or more sets of training data, wherein jointly training the transmitter neural network and the receiver neural network includes individually training multiple neural network architecture configurations of the plurality of neural network architecture configurations.

16. The method of claim 15, further comprising:
determining a current scheduling grant type implemented for the data-receiving device, the current scheduling grant type comprising one of a grant to transmit control information only, a grant to transmit user-plane data only, or a grant to transmit both control information and user-plane data; and
configuring the transmitter neural network and the receiver neural network to implement a neural network architecture configuration of the plurality of neural network architecture configurations that is associated with the current scheduling grant type.

17. A data-receiving device comprising:
a radio frequency front end;
at least one processor coupled to the radio frequency front end; and
at least one storage component storing a set of instructions, the set of instructions configured to manipulate the at least one processor to:
receive, at a receiver neural network of the data-receiving device and via the radio frequency front end, a first transmission wirelessly communicated from a data-sending device;
process the first transmission at the receiver neural network of the data-receiving device to attempt to recover a first data block and to generate a first transmission feedback signal representative of the attempt to recover the first data block;
generate, at a transmitter neural network of the data-receiving device, a second transmission based on the first transmission feedback signal; and
wirelessly communicate the second transmission via the radio frequency front end to the data-sending device.

18. The data-receiving device of claim 17, wherein the second transmission represents a hybrid automatic repeat request (HARQ) signal.

19. The data-receiving device of claim 17, wherein:
the first transmission feedback signal represents a failed attempt to recover the first data block; and
the set of instructions are further configured to manipulate the at least one processor to:
receive, at the receiver neural network, a third transmission wirelessly communicated from the data-sending device;
process the third transmission at the receiver neural network of the data-receiving device to attempt to recover at least a portion of the first data block and to generate a second transmission feedback signal representative of the attempt to recover at least a portion of the first data block; and
generate, at the transmitter neural network, a fourth transmission for wireless communication via the radio frequency front end to the data-sending device based on the second transmission feedback signal.

20. The data-receiving device of claim 19, wherein:
each of the transmitter neural network and the receiver neural network has a plurality of neural network architecture configurations, each neural network architecture configuration associated with a different corresponding scheduling grant type of a plurality of scheduling grant types; and
the set of instructions are further configured to manipulate the at least one processor to:

determine a current scheduling grant type implemented for the data-receiving device, the current scheduling grant type comprising one of a grant to transmit control information only, a grant to transmit user-plane data only, or a grant to transmit both control information and user-plane data; and configure the transmitter neural network and the receiver neural network to implement a neural network architecture configuration of the plurality of neural network architecture configurations that is associated with the current scheduling grant type.

21. A data-sending device comprising:
a radio frequency front end;
at least one processor coupled to the radio frequency front end; and
a non-transitory computer-readable medium storing one or more sets of instructions, the one or more sets of instructions configured to manipulate the at least one processor to:
buffer a first data block in a delay buffer;
process the first data block at a transmitter neural network of the data-sending device to generate a first transmission for wireless communication to a data-receiving device;
wirelessly communicate the first transmission to the data-receiving device via the radio frequency front end;
process a second transmission wirelessly received from the data-receiving device via the radio frequency front end at a receiver neural network of the data-sending device to generate a retransmit control signal;
generate a third transmission for wireless communication to the data-receiving device by applying a gating function to the first data block in the delay buffer using the retransmit control signal as a control input and providing an output of the gating function to an input of the transmitter neural network; and
wirelessly communicate the third transmission to the data-receiving device via the radio frequency front end.

22. The data-sending device of claim 21, wherein the second transmission represents a hybrid automatic repeat request (HARQ) signal from the data-receiving device.

23. The data-sending device of claim 21, wherein:
the retransmit control signal comprises a binary signal; and
the instructions to manipulate the at least one processor to generate the third transmission comprise instructions to manipulate the at least one processor to:
generate the third transmission based on at least a portion of the first data block responsive to the binary signal having a first value; and
generate the third transmission independent of the first data block responsive to the binary signal having a second value.

24. The data-sending device of claim 21, wherein:
the retransmit control signal comprises a non-linear activation function; and
the instructions to manipulate the at least one processor to generate the third transmission comprise instructions to manipulate the at least one processor to generate the third transmission to include one or more portions of the first data block based on the non-linear activation function.

25. The data-sending device of claim 21, wherein each of the transmitter neural network and the receiver neural network has a plurality of neural network architecture configurations, each neural network architecture configuration associated with a different corresponding scheduling grant type of a plurality of scheduling grant types; and
the one or more sets of instructions further includes instructions to manipulate the at least one processor to:
determine a current scheduling grant type implemented for the data-sending device, the current scheduling grant type comprising one of a grant to transmit control information only, a grant to transmit user-plane data only, or a grant to transmit both control information and user-plane data; and
configure the transmitter neural network and the receiver neural network to implement a neural network architecture configuration of the plurality of neural network architecture configurations that is associated with the current scheduling grant type.

26. The data-sending device of claim 21, wherein:
the instructions to manipulate the at least one processor to process the second transmission at the receiver neural network of the data-sending device further comprises instructions to manipulate the at least one processor to process the second transmission at the receiver neural network of the data-sending device to attempt to recover a second data block from the second transmission;
the one or more sets of instructions further includes instructions to manipulate the at least one processor to generate a transmission feedback signal at the receiver neural network of the data-sending device, the transmission feedback signal representing a status of recovery of the second data block from the second transmission; and
the instructions to manipulate the at least one processor to generate the third transmission further include instructions to manipulate the at least one processor to process the transmission feedback signal at the transmitter neural network of the data-sending device.

* * * * *